United States Patent [19]

McWilliams

[11] 4,281,955
[45] Aug. 4, 1981

[54] METHOD AND APPARATUS FOR UNLOADING BULK MAIL VANS

[76] Inventor: Joseph E. McWilliams, 1345 Canterbury La., Glenview, Ill. 60025

[21] Appl. No.: 89,962

[22] Filed: Oct. 31, 1979

[51] Int. Cl.³ .................... B65G 65/00; B65G 67/00; B65G 15/00
[52] U.S. Cl. .................... 414/398; 414/265; 198/311; 198/303
[58] Field of Search ............ 414/398, 87, 786, 80, 414/265, 46, 62, 70; 198/524, 536, 535, 303, 307, 313

[56] References Cited

U.S. PATENT DOCUMENTS

| 2,971,631 | 2/1961 | Gray | 198/303 X |
| 3,416,674 | 12/1968 | Gualandris et al. | 198/611 X |
| 3,837,510 | 9/1974 | McWilliams | 414/265 X |

*Primary Examiner*—Leslie J. Paperner
*Assistant Examiner*—L. E. Williams
*Attorney, Agent, or Firm*—McWilliams, Mann & Zummer

[57] ABSTRACT

A method and apparatus for unloading bulk mail vans in accordance with which the conventional roll-in or piggyback unloading dock conveyors of bulk mail handling centers, such as are operated by the United States Postal Service, are equipped with an auxiliary load receiving conveyor that serves as an implement which provides for largely mechanical transfer of the individual bags and cartons of the bulk mail from their positions of rest in the vehicle to the roll-in conveyor. The auxiliary conveyor is located at the load receiving end of the roll-in conveyor and comprises a positionable conveyor head in the form of a cantilever mounted belt conveyor apparatus having an upright two wheeled chassis that has a draft type connection to the roll-in conveyor frame for movement part and parcel with the roll-in conveyor to bring the conveyor in through the vehicle end opening into close adjacency with the stacked bags and cartons that form the bulk mail to be handled. The conveyor head is mounted for adjusting its projecting load receiving end vertically and horizontally for aiming the head in the general direction of the bags and cartons exposed at the end of the van to operationally position the conveyor head for consecutively transferring the bags and cartons making up the stack being processed onto the head and thence to the roll-in conveyor.

16 Claims, 14 Drawing Figures

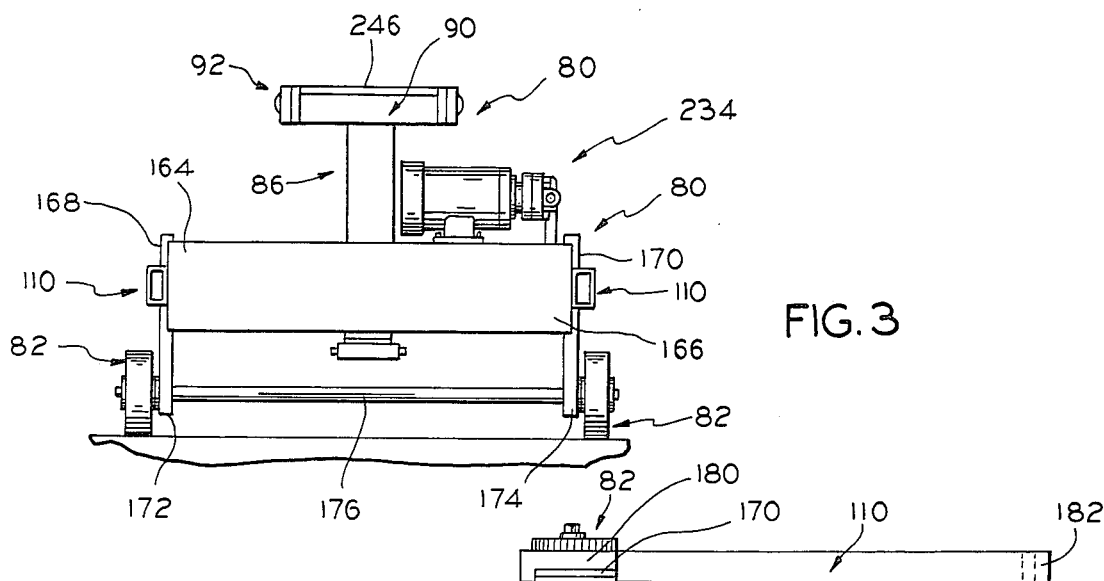
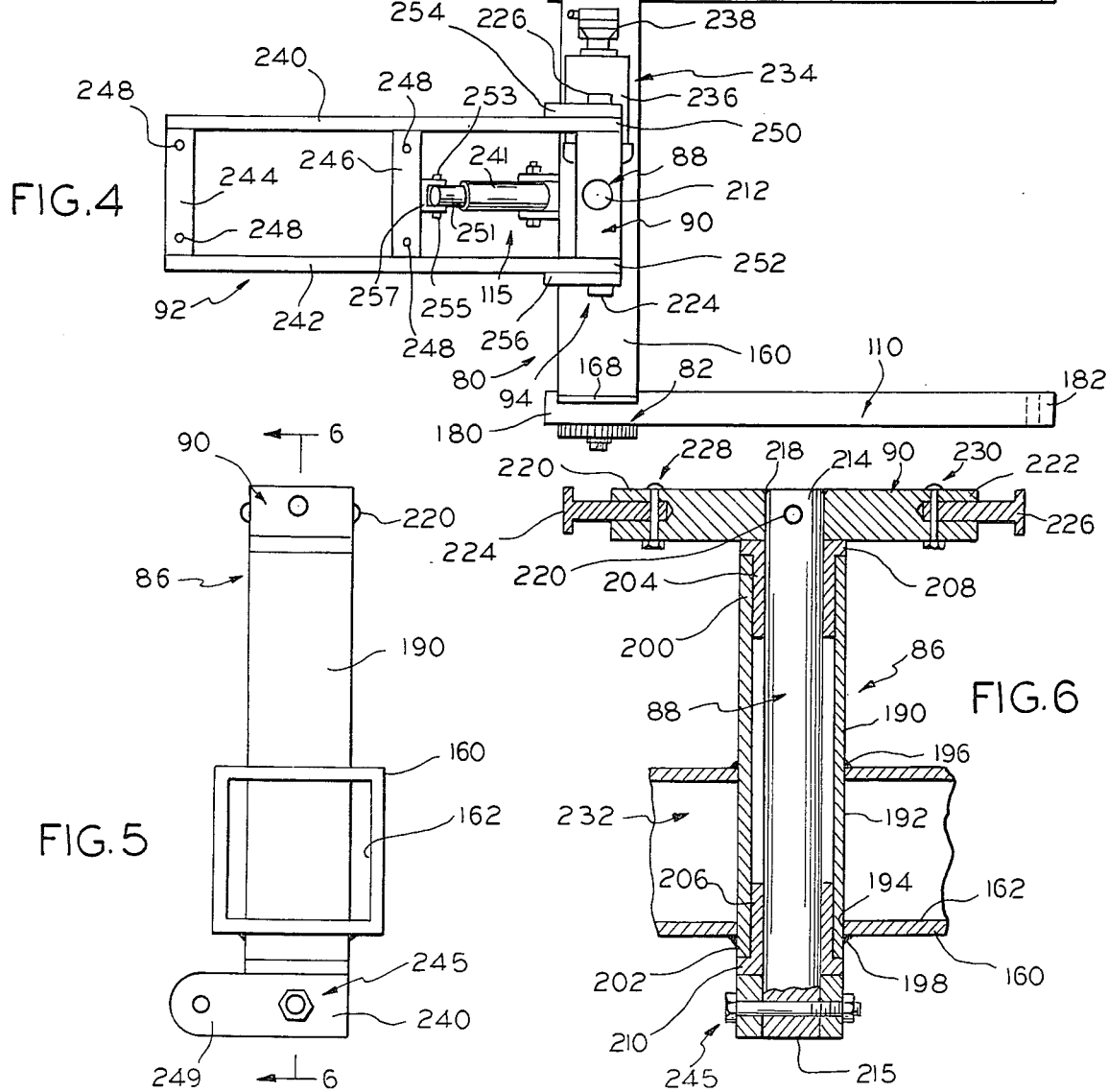

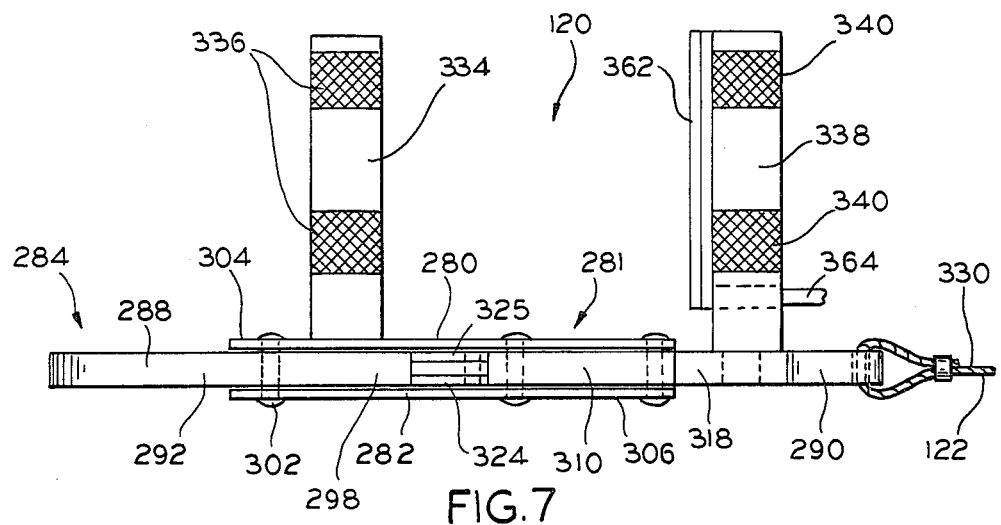
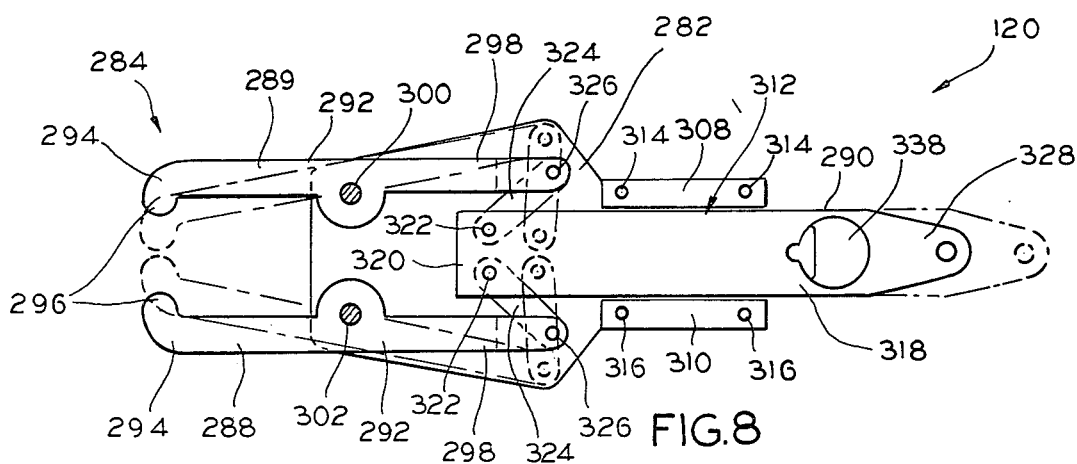
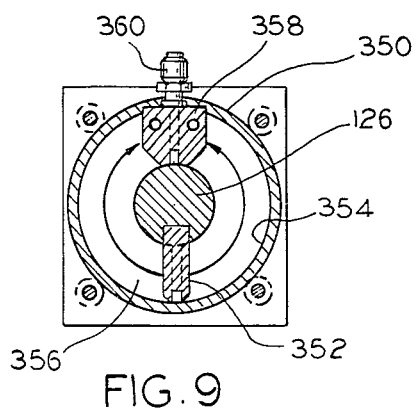

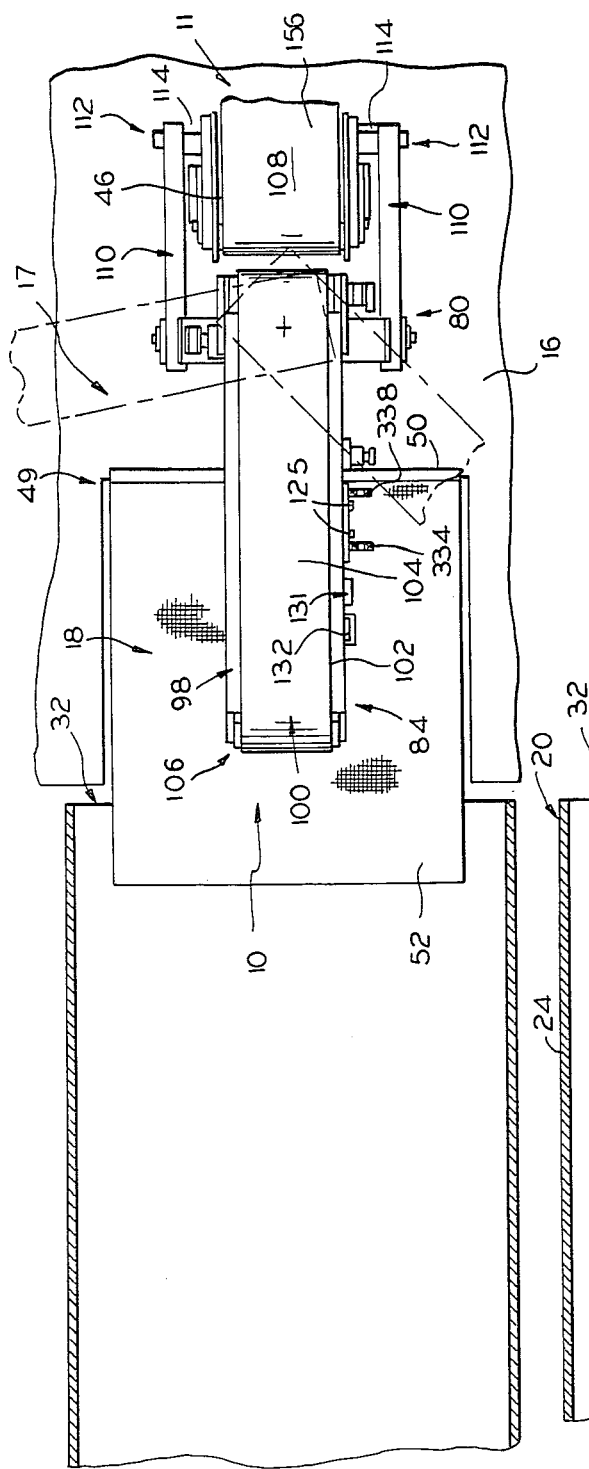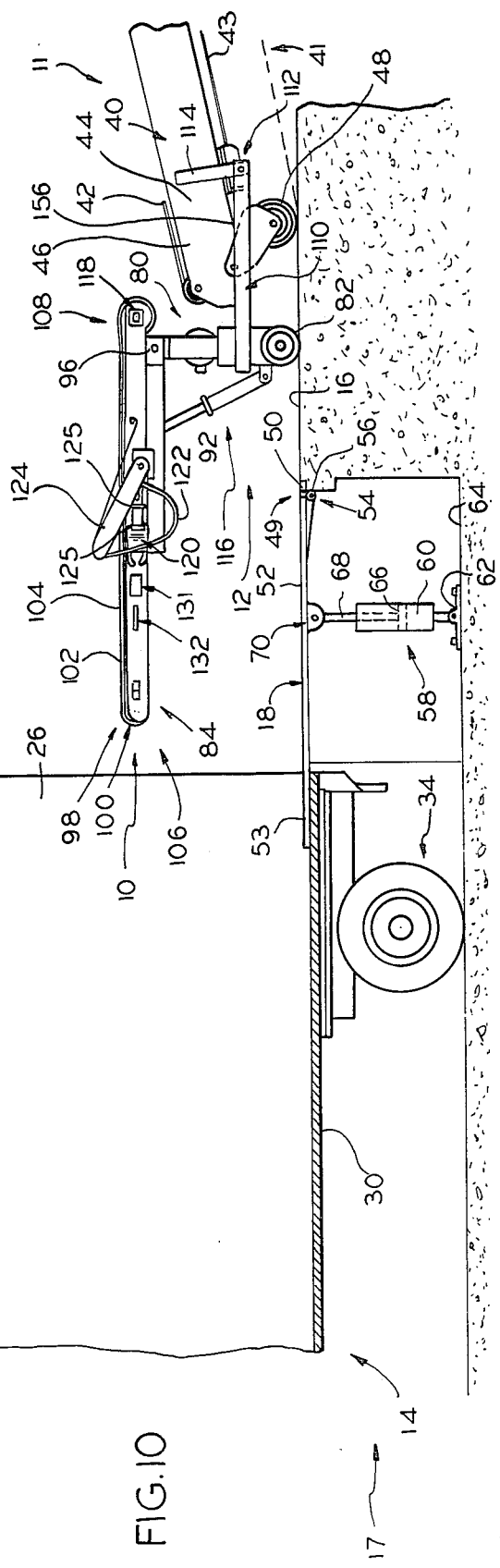

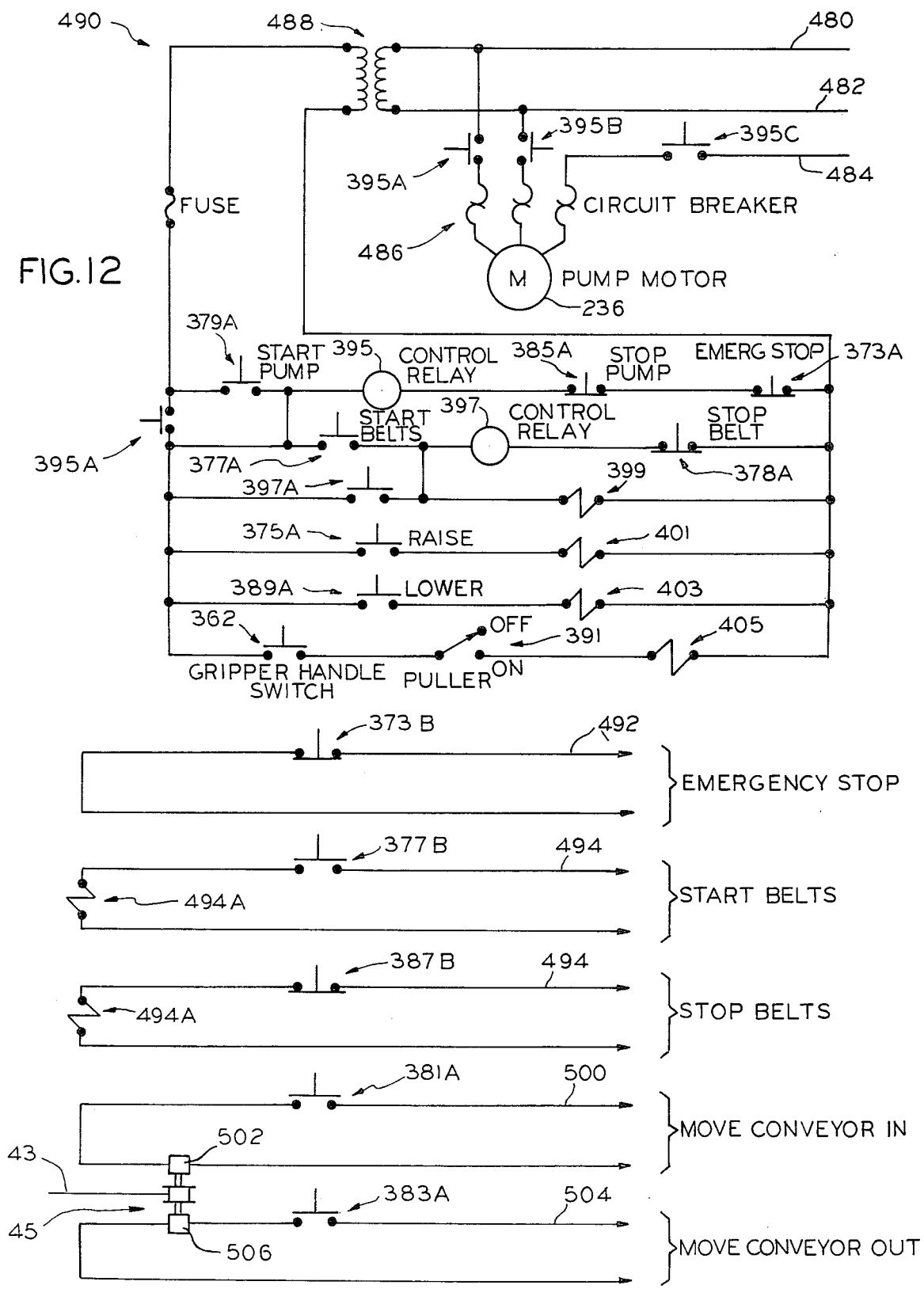

METHOD AND APPARATUS FOR UNLOADING BULK MAIL VANS

This invention relates to a method and apparatus for unloading floor loaded bulk mail vans, and more particularly, to a method and apparatus specifically adapted for use at bulk mail handling centers, such as the U.S. Postal Service bulk mail centers.

Bulk mail centers handle what is generally known as bulk mail, which includes the so-called second and third class mail and parcel post, as well as cartoned goods. Bulk mail thus includes books, magazines, advertising which may be in tied bundles, small parcels, or in other words everything that is not first class mail, the latter being handled by separate facilities suited for that purpose. While much second and third class mail is customarily bagged in the familiar mail bag, cartoned goods stacked separately as such or together with the mail bags are also involved in bulk mail handling.

Bulk mail centers include both incoming and outgoing mail handling facilities. The present invention is concerned with the incoming or unloading side of the bulk mail center. In the U.S.A. the U.S. Postal Service bulk mail center unloading side typically is in the form of an uloading dock structure defining a number of unloading bays each equipped with the familiar roll-in unloading conveyor commonly known as the BMC piggyback unloading conveyor. The basic conveyor arrangement involved for each bay comprises an elongated rolling conveyor assembly equipped with a belt conveyor that operates from an inclined runway, aligned with the bay, which runway slopes upwardly about twenty-five degrees with respect to the working level of the loading dock so that the roll-in conveyor discharge end overlies a second conveyor assembly that is disposed along the runway, to which the bulk mail is transferred for conveyance to the center sorting facilities. The roll-in conveyor, which is also known as a piggyback conveyor, thus has its discharge end disposed in overlying piggyback relation on the unloading dock relative to the conveyor it feeds, and the latter conveyor is of sufficient length so that the roll-in conveyor can feed the bulk mail carried by same to the sorting facility supplying conveyor both when the roll-in conveyor is fully retracted up its inclined runway, and when its load receiving end is extended from its runway to its operating position, to receive bulk mail to be unloaded from a bulk mail van, for the full length of the van load carrying area. In the unloading of such vans, the van, which is a highway vehicle of the end loading semitrailer type, is backed into unloading position in an unloading bay of the facility. For van unloading purposes, the roll-in conveyor for that bay is arranged to be rolled into the van through its end opening to receive the bulk mail bags and cartons involved.

Unloading dock facilities of the bulk mail center type will also typically include for each bay an adjustable dock plate that is to bridge the gap between the dock edge and the vehicle floor, and adjust to accommodate vehicle floors of varying heights, for smooth entry and exit of the load receiving end of the roll-in conveyors into and from the vehicle through the end opening of same.

Conventional roll-in or piggyback conveyors for bulk mail centers are of the belt conveyor type in which the conveyor frame is relatively narrow as compared to the width of the van load receiving compartment, and the width of the belt conveyor involved does not significantly exceed the width of a loaded mail bag. Roll-in conveyors conventionally operate along the center line of the bay they are associated with and the bay is designed to properly align the van with the roll-in conveyor, their movement conventionally being under gravity for movement into the vehicle, controlled by a cable connected to the load receiving end of the roll-in conveyor and extending under the conveyor to a suitable powered and brake winch mechanism for braking movement of the roll-in conveyor downwardly of its runway and pulling the roll-in conveyor back up its runway toward its retracted position. The roll-in conveyor load receiving end has a height that typically disposes the conveyor belt involved in the range of 18 to 30 inches above the floor of the vehicle.

The loads of bulk mail vans, as indicated, typically consist of stacked bag bulk mail and cartoned goods, which the bags and cartons are at rest on the vehicle floor in the form of a plurality of stacks each made up of a number of superposed tiers extending transversely of the vehicle. Bulk mail vans, of which the Fruehauf semi-trailer is a typical example, define load receiving compartments that are typically approximately eight feet wide and approximately ten feet high. In the Fruehauf van the inside width of the compartment is ninety-two inches and the height is one hundred two inches. Mail bags are typically approximately three feet long and about fifteen inches in diameter when fully loaded. However, bags of shorter length are also commonly employed. Postal Service regulations specify that the maximum weight load for three foot long mail bags is seventy pounds, and in the process of loading the bags, when this weight is reached, the bag is supposed to be closed, although bags with higher weights are commonly experienced.

For transportation economy, the van loads are stacked across the full width of the vehicle in its load receiving compartment, with the bags of maximum weight being stacked up to about six feet in height. The individual stacks are formed in successive tiers and it is common practice to apply lighter weight bags on top of the heavier weight bags. Some bags, in this connection, may weigh only twenty to thirty pounds.

The stacks are formed in successive progression beginning at the inner end of the vehicle load receiving compartment and they are stacked in close fitting relation from the front to the rear of the vehicle. Cartoned goods may be stacked in their own individual stacks, or as tiers or parts of tiers of the bag stacks.

In the unloading of the bulk mail vans, the roll-in conveyor is allowed to roll down its runway so that the load receiving end of the roll-in conveyor can be and is brought into adjacency with the first stack of the load at the vehicle end opening of a van disposed in the bay with its end opening open for unloading purposes. The shifting of the bags and cartons from their place of rest within the vehicle to the unloading conveyor is conventionally done manually by one or more workers located at the load receiving end of the roll-in conveyor. The worker manually shifts each bag or carton from its position in the stack onto the loading conveyor, starting with the top tier of the stack and working downwardly until the stack removal is complete.

This involves, insofar as each bag or carton is concerned, the worker pulling the bag or carton from its position in the stack and manually supporting the bag or carton while transferring it to the conveyor. Where the bag or carton is above the level of the conveyor, the worker must accept the weight of the bag or carton to position the bag or carton on the conveyor. Where the bag or carton is below the level of the conveyor, the worker must lift the bag or carton to place it on the conveyor. It will thus be apparent that this type of work requires the worker to make a number of arm, leg and body motions, especially where the bag or carton is located to one side or the other of the vehicle, and is well above or below the conveyor level.

As each stack of bags and/or cartons is removed, the roll-in conveyor is shifted forwardly of the vehicle to handle succeeding stacks in like manner.

Experience has shown that workers manning these conventional unloading conveyors of bulk mail centers experience a high incidence of injuries, which are predominately back injuries and hernias. Analysis of worker movement and stress requirements is manually transferring the bags and cartons to the unloading conveyor has revealed some significant reasons why workers doing this type of work seem to be so injury prone.

For instance, while the weight limit of bagged bulk mail is a nominal 70 pounds to the bag, bulk mail bags can contain the wide variety of things that fall into these second and third class mail categories. Thus, the bags can contain heavy magazines and/or books as well as relatively light weight advertising flyers and the like. Where a bag reaches the 70 pound limit with a largely book or magazine load, the bag may be partially or largely empty due to the heavy materials that are in the bag. On the other hand, where the bag when loaded has received largely relatively light weight items, it may weigh well under the 70 pound limitation.

In any event, the Applicant has observed that 70 pound mail bags found in bulk mail van loads will be in a wide variety of shapes and both partially and fully filled. The nature of mail bags at best is such that they are hard to grasp, lift, carry, and deposit on the roll-in conveyor. For instance, bags half filled with books, magazines and the like will often be interlocked in the stacked vehicle load with other bags of the same or similar content. Bags that are partially filled with heavy materials also tend to shift erratically and thus compound the difficulty of handling same.

Cartoned goods ordinarily will not contain shifting or unbalanced loads. However, the cartons come in a variety of sizes and weights, and the worker has to use both arms in grasping the individual cartons to make the manual transfer involved, because of the parallelepiped shape involved.

The result of the Applicant's consideration of these problems is the conclusion that the high incidence of worker injuries in manning bulk mail center roll-in unloading conveyors is due to the body motion patterns made when under strain, and especially with regard to back and body postures needed to handle mail bags with 70 pound loads.

A complicating factor in working out solutions to these problems is that bulk mail vans may also carry, as part of their load, wheeled containers, palletized goods, and special shipments involving goods of such size, shape or type that they cannot be put through a conveyor sorting system. In order to unload goods in these categories, the roll-in conveyor must be fully retracted into its runway, so that the wheeled containers may be rolled out of the vehicle, across the dock plate and onto the loading dock, and so that four wheel platform lift trucks and the like may have access to and from the vehicle, again across the dock plate, for removal of palletized goods and the like.

A principal object of the present invention is to provide a method and apparatus for unloading bulk mail vans that utilizes the conventional roll-in conveyor and equip same with an auxiliary conveyor, in the nature of a cantilever mounted, positionable, conveyor head, located on the load receiving end of the roll-in conveyor, which permits the handling involved in transferring the bags and cartons to the unloading conveyor to be performed largely mechanically, and eliminates most of the laborious, tiring, and time consuming worker motions and maneuvering, together with the physical effort required to perform same, heretofore required for such purposes, as well as the injury prone nature of this type of work.

Another principal object of the invention is to provide an auxiliary conveyor for conventional roll-in conveyors of the type indicated which is to be located at and be attached to the load receiving end of such conveyors, and which is to include a highly manueverable cantilever mounted conveyor head of which the load receiving end of same is at the projecting end of the head, while the other end of the head is disposed to transfer or deposit the bag and cartoned goods applied to same to the roll-in unloading conveyor, with the conveyor head as a whole becoming a readily positionable instrumentality whereby the worker in handling the bags and cartons uses the conveyor head to do most of arduous work heretofore required for this type of work.

Another principal object of the invention is to provide an auxiliary conveyor for conventional roll-in conveyors that not only permits largely mechanical handling of the bags and cartons to be transferred to the unloading conveyor, but which is also proportioned and arranged so that it can be disposed to completely clear the bay dock plate for full accommodation of four wheel platform lift trucks, wheeled containers, and the like so that they may be freely moved, unencumbered, between the van and the dock over the dock plate.

Another principal object of the invention is to provide a method and apparatus for unloading bulk mail vans in which the conventional roll-in conveyor is equipped at its load receiving end with a highly maneuverable cantilever mounted conveyor head that may be prepositioned by the worker for sliding the bag or carton directly onto the conveyor head, and when heavy mail bags are involved, the head has a power mechanism available that may be coupled to the bag to do this entirely mechanically.

Other objects of the invention are to provide an auxiliary loading conveyor for conventional roll-in conveyors involving a cantilever mounted conveyor arrangement of which the principal operating parts are hydraulically operated, using a hydraulic system that is self contained within the auxiliary conveyor and can be powered through suitable power connections with the roll-in conveyor.

Yet other objects of the invention are to provide an auxiliary loading conveyor attachment for conventional roll-in unloading conveyors that is rugged in construction, that is highly maneuverable and easy to operate, and that is readily adaptable for application to both new and existing BMC facilities, and that is long lived in operation.

In accordance with the invention, an auxiliary conveyor is provided for conventional BMC roll-in conveyors which is in the form of an attachment to be applied to the load receiving end of same, and comprises a two wheeled upright chassis arranged for a draft type coupling connection in tandem with and to the roll-in conveyor frame, and mounts cantilever fashion on its upper end a vertically and horizontally swivelable conveyor head, which in its operating mode forms an extension of the conventional roll-in unloading conveyor and extends toward the front of the loading bay that the roll-in conveyor is associated with; the conveyor head thus has its load receiving end leading the roll-in conveyor when the two are together advanced toward and into a van that has been positioned in the bay for unloading purposes. The conveyor head is mounted for vertical swinging movement to shift the load receiving end of same from an upwardly projecting position adjacent the roof of the van, to a position in substantial abutting relation with the vehicle floor, and for side to side swinging movement on the order of eithty degrees to either side of the center line of the movement path of the roll-in conveyor. The conveyor head comprises a belt conveyor assembly of a self contained nature separately mounted on an elongate frame that is in turn pivoted to the upper end of the chassis to provide the vertical swinging movement of the conveyor that is involved. In a preferred form, the chassis journals an upright shaft for pivotal movement about its longitudinal axis to the upper end of which shaft the conveyor head frame is pivotally connected thereto cantilever fashion. hydraulic piston and cylinder assembly connected between the lower end of the shaft and the conveyor frame supports the projecting end of the conveyor head and the load supplies thereto, and as well provides for ready vertical adjustment positioning of the head. The journaling of the upright shaft by the chassis provides for drag free side to side manual positioning of the conveyor head by the worker, as needed in handling specific bags or cartons of a stack, with sufficient static friction being built into the journaling arrangement so that the head will remain in its desired position of adjustment after being so disposed by the worker, without drift therefrom.

The belt conveyor assembly in its preferred form provides an upwardly facing load transport surface that extends the length of the head, which length is roughly equivalent to the nominal eight foot width of bulk mail vans currently in use. The head transport surface when horizontally disposed is about three feet about the transport vehicle floor, and the conveyor assembly has a width that is approximately one-quarter of the vehicle width, with the belt forming the conveyor transport surface having an eighteen inch width in a commercial embodiment. The belt conveyor is driven hydraulically at the same speed as the roll-in conveyor, which is one hundred feet per minute.

Further in accordance with the invention, the conveyor head is equipped with a bag grabber and associated hydraulically operated swing arm, to the projecting end of which the bag grabber is cable connected. The swing arm is pivotally mounted at its other end to one side of the conveyor head to swing in a vertical plane that extends longitudinally of the conveyor head, this being effected by a hydraulically powered actuator, the operation of which is controlled by a switching arrangement including switch components built into the bag grabber. The bag grabber and associated swing arm are provided to effect substantially total mechanical transfer of heavy mail bags from a position of rest in the vehicle onto the conveyor head.

The conveyor head has its controls in push button or the like form located in a panel arrangement on one side of the conveyor head adjacent its projecting end for convenient operation by the worker, who in practicing the method aspects of the invention, will be able to use the conveyor head as a tool and source of power to effect a largely mechanical transfer of the bags and cartons from their positions at rest in the vehicle to the roll-in unloading conveyor. In using the conveyor head, the nose of same that is defined by the projecting end of the head is manually movable with ease across the entire width of the van, and hydraulically raised or lowered with push button control certainty, to provide the positioning needs desired to practice the invention.

Starting with the end stack of the vehicle disposed in the unloading bay for unloading purposes, assuming that the usual doors of the vehicle end opening have been opened for access into the vehicle, and the roll-in conveyor and its auxiliary conveyor head attachment have been positioned to bring the projecting end of the conveyor head in close adjacency to the first stack of bags or cartons, the worker in commencing the unloading process elevates the nose or projecting end of the conveyor head to a level below the level of the top row of bags or cartons in the stack which may conveniently lie in the range of from about two to about twelve inches in practice. The worker than selects one of the bags or cartons in the top tier of the stack, preferably a bag or carton at one or the other of the ends of the stacked tier involved, and aligns the nose of the conveyor head with it, this being accomplished by pushing or pulling the conveyor head about its upright swing axis, using a handle on the head conveyor apparatus that is provided for this purpose. The conveyor head is thus now "aimed" as needed at the selected bag or carton.

Where the selected bag or carton is judged by the worker to be of relatively light work, something those with experience in doing this type of work can readily tell, the worker may now pull the selected bag rearwardly of the vehicle sufficiently until enough of it has been pulled out so that by dropping the pulled out portion of the bag on the head load transport surface, which dropping action the worker performs, the dropped portion of the bag will engage the head transport surface with sufficient traction to draw or pull the bag in question the rest of the way out of the stack and onto the conveyor head for conveyance onto the roll-in unloading conveyor.

The next adjacent bags are consecutively handled in like manner, with the conveyor head being swung sidewise of the vehicle as needed to align the head nose with the selected bag without changing the vertical position of the conveyor nose, and thus the worker is appropriately "aiming" the head at the selected bag for effecting transfer of the bag onto the conveyor head. When the removal of the first tier of the stack has been completed, the conveyor head nose is lowered to a similar level below the level of the next tier of bags, and the removal of the next stacked tier effected in a similar manner. Lower tiers are successively handled in like manner until removal of the stack is complete, whereupon the roll-in conveyor is advanced a tier width into the vehicle for handling the next stack in like manner. Subsequent stacks are similarly processed in a consecutive manner until the load has been fully transferred to the unloading dock.

Where the worker judges that a particular bag to be shifted is heavy or is going to be awkward or unwieldly to handle, the worker uses the unloader head bag grabber, which is equipped with a pair of jaws that may be applied to a convenient exposed part of the bag, that close on the bag to grip same when the conveyor head swing arm is actuated to tension the cable connected between same and the bag grabber, with the swing arm swinging rearwardly of the vehicle to mechanically draw the bag from the stack and onto the conveyor head. When the bag moves with the auxiliary conveyor head, the bag grabber automatically releases the bag and the swing arm is returned by its controlling mechanism to the original, at ready position, for effecting a similar operation.

When palleted goods or wheeled containers are encountered in the vehicle load, the roll-in conveyor and its auxiliary conveyor of this invention are fully retracted back onto the loading dock, and the conveyor head fully elevated and swung to one side as needed to provide for full access of four wheel platform lift trucks into and out of the vehicle and removal of the wheeled containers from the vehicle, over the dock plate of the bay in question. The two wheel upright nature of the auxiliary conveyor chassis provides the necessary working space to achieve this end, which is an essential in view of the limited space between the load receiving end of the roll-in conveyor in its fully retracted position and the dock plate.

Other objects, uses, and advantages will be obvious or become apparent from a consideration of the following detailed description and the application drawings in which like reference numerals are employed to indicate like parts throughout the several views.

IN THE DRAWINGS:

FIG. 1A is a fragmental view illustrating on an enlarged scale the push button control panel employed on the auxiliary conveyor of FIG. 1;

FIG. 3 is an end view of the auxiliary conveyor chassis as viewed from the right hand side of FIG. 1, with the conveyor assembly of the conveyor head omitted from the frame to which it is removably mounted, and the roll-in conveyor omitted;

FIG. 4 is a plan view of the chassis and associated parts shown in FIG. 3;

FIG. 5 is an enlarged side elevational view of the chassis cross beam and conveyor swing mounting structures, on an enlarged scale and viewed as a subassembly, and with the cross beam end plates omitted;

FIG. 6 is a fragmental cross-sectional view taken substantially along line 6—6 of FIG. 5;

FIG. 7 is an enlarged view of the bag grabber hand tool as shown in FIG. 1, illustrating specific details of construction;

FIG. 8 is a top plan view of the bag grabber device shown in FIG. 7, with its top plate omitted for ease of illustration and showing the open position of the grabber jaws in full lines and the closed position of the grabber jaws in dashed lines;

FIG. 8A is a fragmental side elevational view of the conveyor head, showing the bag grabber tool of FIGS. 7 and 8 as carried by the conveyor head when the tool is not in use;

FIG. 9 is a diagrammatic cross-sectional view of the rotary actuator for the bag grabber swing arm, taken substantially along line 9—9 of FIG. 2;

FIGS. 10 and 11 are similar to FIGS. 1 and 2, respectively, except that the roll-in conveyor and the auxiliary conveyor of this invention are shown at the position of maximum retractment of the roll-in conveyor on the loading dock, with the dock plate also being diagrammatically illustrated;

FIGS. 12 and 13 are schematic views diagrammatically illustrative, electrical circuiting appropriate for practicing the invention.

Figure 1:
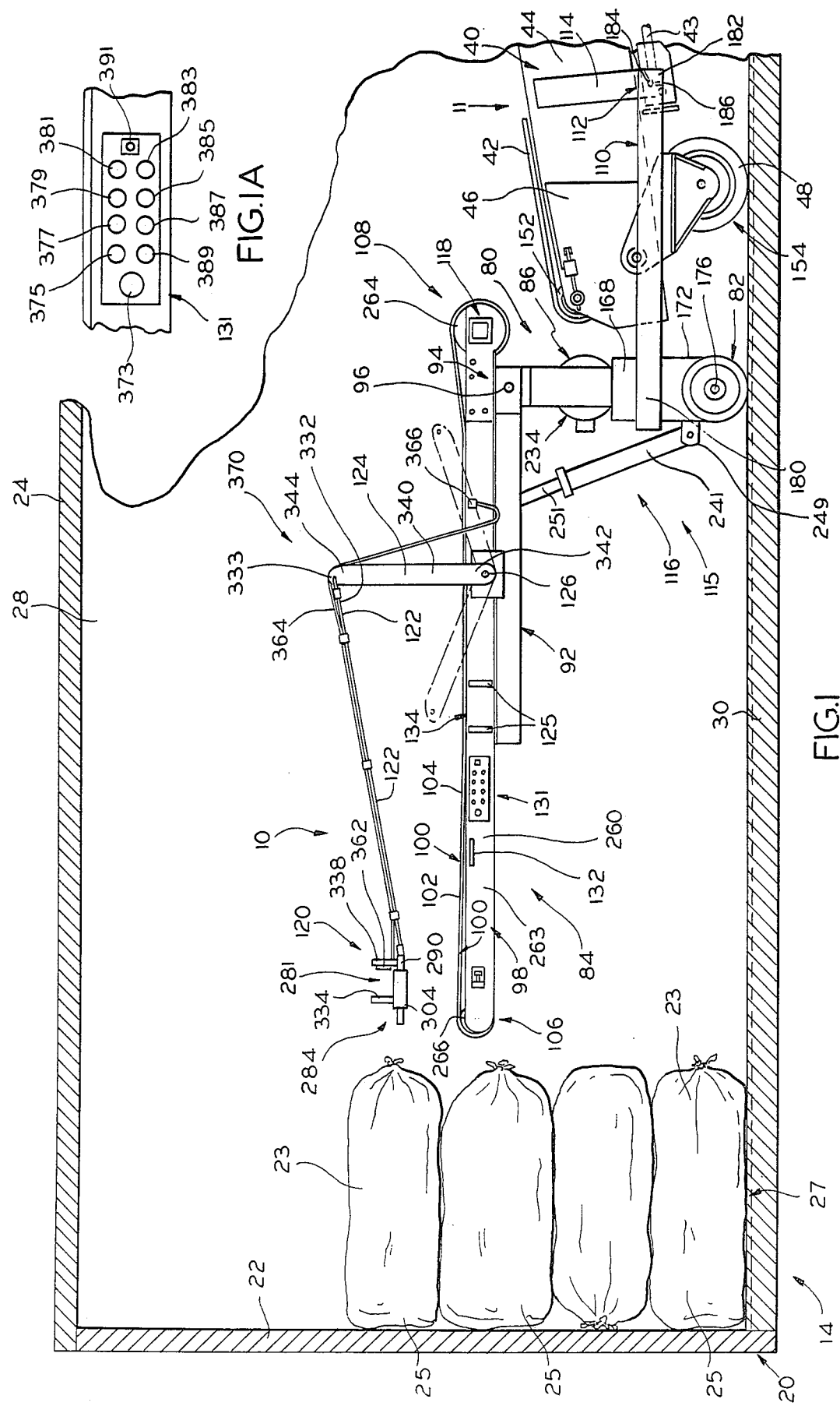
FIG. 1 is a diagrammatic side elevational view of one embodiment of the invention shown in operation within an end loading highway vehicle that is shown in vertical section, with the conveyor head bag grabber device shown positioned for use, and its swing arm shown in three positions of operation.

However, it is to be specifically understood that the specific drawing illustrations provided are supplied primarily to comply with requirements of the Patent Laws, and that the invention is susceptible of modifications and variations that will be obvious to those skilled in the art, and which are intended to be covered by the appended claims.

GENERAL DESCRIPTION

Reference numeral 10 of FIGS. 1, 2, 10 and 11 indicates one embodiment of the present invention applied to roll-in conveyor 11 of a bulk mail center unloading dock or platform 12 that is conventionally provided with a level load support surface 16 and the conventional dock plate 18 of unloading bay 17, with the dock plate 18 being arranged to be appropriately positioned in the usual manner between the unloading dock 12 and the vehicle 14 for purposes of unloading the vehicle 14 into the facilities represented by the unloading platform 12.

The vehicle 14 is in the form of the usual body 20 defined by forward end wall 22, top wall 24, side walls 26 and 28, floor 30 and end opening 32 (see FIGS. 10 and 11) that is customarily closed by suitable doors or the like (not shown). The body 20 in practice is intended to represent any conventional vehicle of the van or semi-trailer type, one specific embodiment of which is the well known Fruehauf semi-trailer. The body 20 rides on the usual rear wheels 34 and is provided with the usual kingpin (not shown) for connection to the fifth wheel of a conventional truck tractor (not shown). When disconnected from the truck tractor, the vehicle rests on suitable retractable props (not shown) adjacent its forward end, as is well known in the art. However, the invention is adapted for practice in connection with any suitable form of end loading vehicle.

The roll-in conveyor 11, which is also termed a piggyback conveyor, in and of itself is entirely conventional in nature and that illustrated is intended to represent roll-in conveyors of the type employed by the U.S. Postal Service in its bulk mail center unloading docks. Roll-in conveyor 11 comprises a suitable frame 40 on which belt conveyor 42 is suitably trained. Frame 40 consists of the usual side plates 44 secured together in any suitable manner, with the frame 40 at the load receiving end 46 of conveyor 11 riding on suitable wheels 48. As is conventional, conveyor 11 rides up and down a runway mounted on dock 12, and indicated by the dashed lines 41, to incline upwardly at an angle of about twenty-five degrees with respect to the horizontal, over a stationary conveyor assembly (not shown) having a moving belt to which the bulk mail is transferred for conveyance to the center sorting facilities. The roll-in or piggyback conveyor 11 is connected by cable 43, suitably applied to the load receiving end of conveyor 11 (or its underside), to a winch assembly suitably mounted on the dock and powered to pull conveyor 11 up its runway 41 to its fully retracted position, and permit conveyor 11 to roll, under gravity and under suitable braking conditions within the winch assembly, downwardly of runway 41 and into the vehicle 14 to its fully extended position, which conventionally disposes the load receiving end 46 of same as far to the left of FIGS. 1, 2, 10 and 11, as is needed to fully unload vehicle 14. The winch assembly is diagrammatically illustrated in FIG. 13, where indicated by reference numeral 45.

As the unloading conveyor equipment represented by roll-in conveyor 11 is well known to the art, only the load receiving end 46 and associated parts of same are shown in the drawings. As indicated, conveyor 11 in its retracted relation is disposed in an upwardly inclined trackway that defines runway 41 for the conveyor 11, with a second conveyor being located under same and being proportioned lengthwise of same relative to the load discharging end of conveyor 11 such that in all possible operating positions of the conveyor 11 between the fully retracted position of FIGS. 10 and 11 and the substantially fully extended positions of FIGS. 1 and 2, the load discharge end of conveyor 11 will discharge the bags and cartons placed thereon onto the underlying receiving conveyor which in turn takes the bags and cartons involved to the bulk mail center sorting facility.

The dock plate 18 (see FIGS. 10 and 11) is only diagrammatically illustrated as it is entirely conventional in nature, it comprising a suitable hinge structure 49 comprising a fixed hinge leaf 50 suitably affixed to the unloading platform 12, and movable leaf 52 connected thereto by suitable hinged connection 54, with the leaf 52 being adjustable vertically about the horizontal pivot axis 56 defined by the hinge structure 54 to accommodate variance in levels of the floors 30 of vehicles that are parked in the bay 17 for purposes of unloading the van or other highway vehicle involved. The dock plate leaf 52 may be adjusted vertically in any suitable manner; for illustrating purposes, hydraulic piston and cylinder assembly 58 is illustrated comprising suitable hydraulic cylinder 60 having its adjustable foot 62 resting on and suitably fixed to floor surface 64 and reciprocably receiving piston 66 of piston rod 68 that is suitably pivotally connected to the hinge 52 where indicated by reference numeral 70. Hydraulic piston and cylinder device 50 may be operated in any suitable manner using a suitable hydraulic system to properly position the dock plate leaf 50 relative to the vehicle floor 30 when the vehicle 14 is being backed into unloading position so that the vehicle body 20 receives the dock plate in the manner indicated in FIGS. 10 and 11, which then can be rested on the vehicle body floor 30 in the manner suggested by FIG. 10, whereby special conveyor 10 and the roll-in conveyor 11 are readily movable as a unit across dock plate 18 and into the vehicle body 20. In practice, unloading docks of BMC facilities typically will have a number of parallel bays 17 in close adjacency, with the bays and dock plates 18 therefor being provided on twelve foot centers. The dock plates are typically six feet wide and adjacent dock plates are separated by a distance of six feet. Thus, the distance between the center line of adjacent bays 17 and dock plates 18 is twelve feet.

In accordance with the present invention, the roll-in or piggyback conveyor 11 of BMC facilities is equipped with auxiliary conveyor 10 which comprises an upright chassis 80 riding on a pair of wheels 82 and swivelly mounting, at a level somewhat above the normal operating level of the load receiving end 46 of conveyor 11, a conveyor head 84 which is mounted cantilever fashion on the chassis 80 and to have the horizontal and vertical swivelling action that is suggested in the drawings. The chassis 80 is formed to define a centrally located post or pedestal structure 86 receiving and journaling upright pivot shaft 88 (see FIG. 6) having keyed thereto at its upper end cross bar 90 to which mounting frame 92 of the conveyor head 84 is pivotally connected as at 94 for swinging movement about horizontal axis 96. The conveyor head mounting frame 92 has suitably affixed thereto conveyor assembly 98 that includes conveyor belt 100 suitably trained on the assembly 98. Belt 100 defines upper run 102 defining the upwardly facing load transport surface 104 that is to convey the bags and cartons to be unloaded to the load receiving end 46 of the conveyor 11. The conveyor head 84 thus defines projecting load receiving end 106 and load discharge end 108 that is located in load discharge relation to the roll-in conveyor load receiving end 46, as indicated in the drawings.

Figure 2:
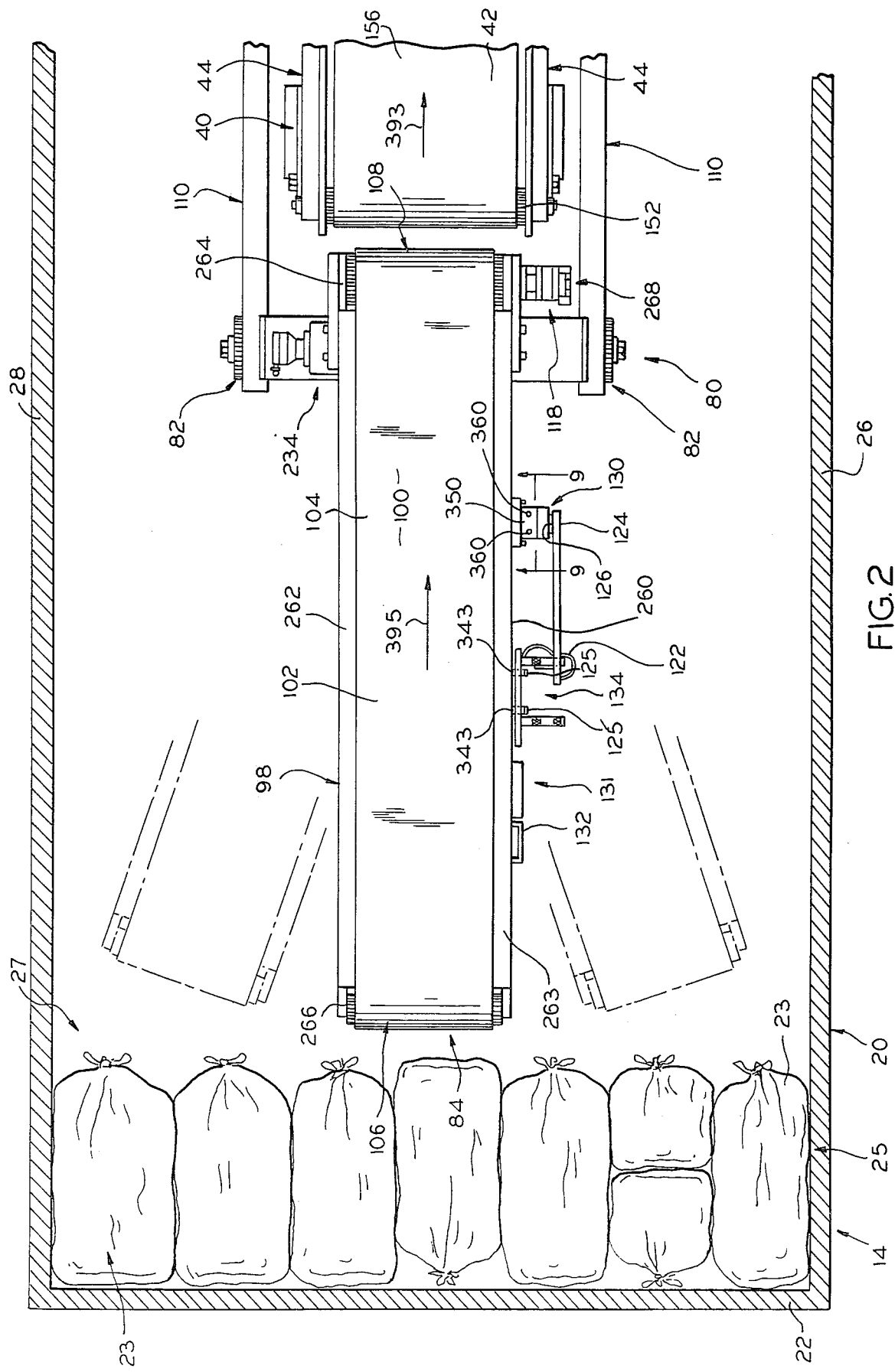
FIG. 2 is a plan view of the conveyor assembly shown in FIG. 1, with the highway vehicle being shown in horizontal section.

As indicated in FIGS. 2 and 11, the conveyor 10 is aligned with the longitudinal center line of conveyor 11 and it is a feature of the invention that the conveyor apparatus 10 be secured to the load receiving end 46 of the conveyor 11 for movement therewith in tandem relation thereto. In the form illustrated, this is effected by a pair of spaced apart tie or draft bars 110 fixed to the opposite ends of the chassis 80 and extending to either side of the conveyor 11 for pivotal connection as at 112 to the respective connection plates or bars 114 that are suitably affixed to the frame 44 of conveyor 11 for this purpose.

Operably interposed between the lower end of the swing shaft 88 and the mounting frame 92 is an adjustable strut structure 115 in the form of a hydraulic piston and cylinder assembly 116 that is to hold the conveyor head 84 at a desired position of vertical or hinged adjustment, against gravity, applied to it, and also to shift the conveyor head 84 vertically about axis 96, as needed in practicing the invention.

The conveyor 100 is driven by suitable hydraulic drive 118 to run at a speed that equals that of the conveyor 42, which is typically one hundred feet a minute.

The auxiliary conveyor 10, in accordance with the invention, is equipped with a bag grabbing tool 120 anchored by cable 122 to swing arm 124 mounted on the conveyor head 84 to pivot about horizontal pivotal axis 126 under the drive of suitable rotary actuator 130 to move between the two broken line positions of FIG. 1, under the control of the operator, when the bag grabber hand tool 120 is to be utilized. Tool 120 is available for use by the operator in the manner herein described when a mail bag to be applied to roll-in conveyor 11 is considered by the operator to be heavy, unwieldy, or otherwise requiring mechanical action to apply the bag to the conveyor head 84. When not needed, hand tool 120 is rested on support brackets 125 carried by conveyor assembly 98.

The conveyor head 84 is equipped with a control panel 131 providing pushbutton or the like controls for use by the worker in operating the apparatus 10. The conveyor head 84 is shifted from side to side by the operator grasping suitable handle 132 of the assembly 98, as needed. When hand tool 120 is not being used, as indicated, it may be rested on the brackets 125 that form tool support 134 of assembly 98, or otherwise removably secured to conveyor head 84 in an out of the way position.

SPECIFIC DESCRIPTION

The unloading dock 12 that is illustrated is intended to represent, diagrammatically, conventional BMC unloading docks now commonly associated with United States Postal Service BMC installations or the like that include a number of adjacent unloading bays 17.

The roll-in conveyor 11 that is illustrated is intended to represent any standard conveyor apparatus of this type customarily employed in connection with Postal Service BMC unloading docks employed to handle bulk mail. For illustrative purposes, the frame 40 of conveyor 11 comprises the pair of side plates 44 suitably joined together in spaced apart relation and journaling the usual pulleys 152 over which conveyor belt 42 is suitably trained. At its load receiving end 46, conveyor frame 40 rides on wheels 48 forming a part of a conventional wheel assembly 154 suitably connected to frame 44. Frame 40 to the right of the showings of FIGS. 1, 2, 10 and 11 rides on suitable rollers (not shown) that in turn ride on the upwardly inclined runway 41 for conveyor 11, which as indicated, inclines upwardly from the level of loading dock surface 16 at an angle of approximately 25 degrees.

The attachment plates 114 to which the auxiliary conveyor connecting members 110 are pivotally connected are suitably anchored to the respective frame side plates 44, as by employing welding, bolt and nut assemblies, or the like (not shown). Conveyor belt 42 also defines upwardly facing load transport surface 156 onto which the unloaded bags and cartons are deposited at the load receiving end 46 of conveyor 11 for conveyance to the discharge end of conveyor 11 in the manner conventionally employed for roll-in conveyors 11.

FIGS. 10 and 11 illustrate the position of the conveyor 11 in its position of maximum retraction of its runway 41, from which it will be observed that the spacing between the end 46 of the conveyor 11 and the dock plate 18 is minimal. An important aspect of the present invention is that the auxiliary conveyor 10 be located in spaced relation to the dock plate 18, and have the conveyor head 84 arranged so that it can be both swung to one side or the other approximately eighty degrees from longitudinal alignment with the conveyor 11, and angled vertically up to approximately 45 degrees with respect to the horizontal. This positioning capability of the conveyor apparatus 10 permits four wheel platform lift trucks to be readily moved between the unloading dock and the vehicle floor 30 across the dock plate 18 free of interference with the conveyor 10 when conveyors 10 and 11 are in their fully retracted positions. Similarly, wheeled containers can be removed from the vehicle body 20 onto the unloading platform across dock plate free of interference with a conveyor 10 under similar conditions of retraction of conveyors 10 and 11.

On the other hand, when a loaded vehicle 14 is disposed in bay 17, as indicated in the drawings, for unloading purposes, the auxiliary conveyor 10, it being disposed at the load receiving or head end 46 of conveyor 11, is positioned for immediate use in handling the initial bag and/or carton stacks that appear at the rear end of the vehicle body 20 when the end opening 32 is opened for unloading purposes.

THE AUXILIARY CONVEYOR

Turning now more specifically to the auxiliary conveyor 10, the chassis 80 comprises tubular cross beam 160 that is of quadrilateral transverse cross-sectional configuration (square in the illustrated embodiment, see FIG. 5), defining bore 162. The cross beam 160 at its ends 164 and 166 is closed by the respective upright end plates 168 and 170 that at their respective lower ends 172 and 174 receive shaft 176 on the ends of which the respective wheels 82 are suitably journaled. The draft bars 110 in the form illustrated are of quadrilateral tubular transverse cross-sectional configuration (see FIG. 3), and at their ends 180, are made fast to the respective end plates 168 and 170, as by employing welding. The draft bars 110 at their ends 182, in the form shown, are suitably pivotally connected to connection bars 114 by suitable pins 184, so that chassis 80, and this conveyor 10, is tandem connected to conveyor 11 for movement therewith.

It will thus be observed that the connection at the auxiliary conveyor draft members 110 has with the roll-in conveyor 11 not only connects the conveyor 10 to the conveyor 11 for to and fro movement therewith, but also the auxiliary conveyor 10 is connected to the conveyor 11 for swinging movement about horizontal axis 186 that is aligned with the pins 184. This permits the auxiliary conveyor 10 to adjust with respect to the conveyor 11 to accommodate upward or downward slope of dock plate 18 that may be occasioned by the elevation of the floor 30 of the particular vehicle 14 disposed in bay 17 for loading, and also to accommodate the tendency of the conveyor 11 to move to a more flat angled relation with respect to the dock surface 15 as the conveyor 11 is extended into the vehicle from its runway.

As already indicated, the chassis 80 includes upright tubular post or piller 86 which comprises tubular cylinder 190 inserted in the centrally located upper and lower openings 192 and 194 that are formed in cross beam 160 for this purpose (see FIG. 6) and fixed in place, as by welding at 196 and 198. Cylinder 190 at its upper and lower ends 200 and 202 has press fitted therein the respective bearing sleeves 204 and 206 (see FIG. 6), which are provided with the respective end flanges 208 and 210 which are fitted against the terminal end portions of the cylinder 190. The sleeves 204 and 206 are preferably formed from bronze or the like, and journal for pivotal swinging movement about its longitudinal central axis 212 the upright shaft 88.

Shaft 88 at its upper end 214 has fixed to same elongate cross bar 90. Bar 90 is welded to shaft 88 as at 218, and cross pin 220 extending through the shaft 88 and bar 216 keys the shaft 88 to bar 216.

Bar 90 at its respective ends 220 and 222 is equipped with suitable pivot pins 224 and 226, respectively, that pivotally connect the conveyor head mounting frame 92 to bar 216 for pivotal movement about swing axis 96. Pins 224 and 226 are respectively held in mounted position, as by employing suitable bolt and nut assemblies 228 and 230 (see FIG. 6).

The cross beam 160 together with its end plates 168 and 170 and the cylinder 190, in accordance with a specific aspect of the invention, define hydraulic tank or sump 232 in which the hydraulic pressure liquid to be employed to power the hydraulic components of the conveyor 10 is contained. Mounted on the top of cross beam 160 to one side of the cylinder 190 is a suitable motor driven hydraulic pump assembly 234, comprising motor 236 and pump 238 that supply the hydraulic pressure liquid to the hydraulic pressure liquid driving components employed in the apparatus 10, as will be described hereinafter.

The conveyor head mounting frame 92 comprises a pair of spaced apart longitudinal frame members 240 and 242 joined together by spaced transverse frame members 244 and 246 that are respectively provided with the respective bolt holes 248 that receive suitable bolt and nut assemblies (not shown) by which the conveyor assembly 98 is mounted on the frame 92. The ends 250 and 252 of the respective longitudinal frame members 240 and 242 are pivotally mounted on the respective pins 224 and 226. In the form shown, the frame ends 250 and 252 have respectively affixed thereto suitable washer forming plates 254 and 256 that are proportioned transversely thereof so that the frame member ends and their respective plates 254 and 256 fill the space between the ends of the cross bar 216 and the heads of pins 224 and 226, respectively.

The conveyor assembly 98 comprises a pair of spaced apart longitudinally extending frame members 260 and 262 joined together by suitable transverse frame members (not shown), two of which are positioned for alignment with and connection to the respective transverse frame members 244 and 246 of support frame 92. The side frame members 260 and 262 and their connecting transverse members form conveyor frame 263. Conveyor belt 100 is suitably trained over drive pulley 264 and tail pulley 266 that are suitably journaled in the frame 263 together with other training and take up pulleys and the like conventionally employed with a conveyor of the type illustrated by conveyor assembly 98. Drive pulley 264 is driven by suitable hydraulic motor 268 suitably keyed to drive roller 264 to form hydraulic drive assembly 118. In a preferred embodiment, the hydraulic motor is a CHAR-LYNN 2000 series hydraulic motor made and sold by Eaton Corporation of Eden Prairie, Minnesota, but for purposes of the invention any comparable hydraulic drive unit would be suitable. The specific hydraulic motor specified provides high torque at the preferred relatively low belt speed desired for belt 102, which as indicated, is one hundred feet per minute (the same speed as the roll-in conveyor belt 42).

The hydraulic piston and cylinder device 116 comprises a hydraulic cylinder 241 pivotally connected to clevis 243 that is in turn secured to the lower end 215 of shaft 88, by suitable bolt and nut assembly 245 (see FIGS. 5 and 6). Suitable pin 247 pivotally connects hydraulic cylinder 241 between the arms 249 of clevis 243. Cylinder 241 receives the piston head (not shown) of piston rod 251 that is pivotally connected by pin 253 (see FIG. 4) to and between the respective arms 255 of clevis 257 that is suitably anchored to frame 92.

Device 116 in practice may be in the form of the SR Series 2500 psi ram made and sold by Texas Hydraulics, Inc. of Temple, Tex., or its equivalent.

BAG GRABBER AND PULLER ASSEMBLY

The bag grabber 120 is best shown in FIGS. 7 and 8 and generally comprises a pair of spaced apart similar side plates 280 and 282 having mounted between same a pair 284 of grabber jaws 286 and 288 and an actuator member 290 therefor.

The jaws 286 and 288 each comprise a lever member 292 having a jaw end 294 defining a gripping protuberance 296, and an actuating end 298 that is disposed within the frame or housing 281 defined by the side plates 280 and 282. The levers 292 are disposed in spaced apart opposed relation and are pivotally mounted between plates 280 and 282 by the respective rivets 300 and 302.

The pair 284 of jaws 286 and 288 is mounted at the head end 304 of the housing 281, and the housing 281 defines a tail portion 306 of rectilinear configuration in which along the side edges of same the respective guide bars 308 and 310 (see FIG. 8) are disposed to define slideway 312 for the actuating member 290. The guide bars 308 and 310 are secured in place by the respective pairs of rivets 314 and 316 that secure together the tail end 306 of the frame or housing 281.

Actuator member 290 is elongate slide bar 318 having pivotally connected at its inner end 320, as at 322, pairs of upper and lower toggle links 324 and 325 which are respectively connected as at 326 to the actuating ends 298 of levers 292 (the upper links 325 are omitted from the diagrammatic showing of FIG. 8). The outer end 328 of member 290 has the end 330 of cable 122 made fast thereto in any suitable manner, with the other cable end 332 being similarly made fast to swing arm 124, as at 333, as indicated in FIG. 1.

It will thus be seen that the frame or housing 281 of the bag gripping hand tool 120 is generally planar in configuration. Plate 280 has suitably affixed to same cylindrical hand grip handle 334, suitably knurled, as at 336, while actuator member 280 has affixed thereto similar handle 338 suitably knurled as at 340. The handles 334 and 338 are in spaced apart relation, and extend normally of the plane of frame or housing 281. They are also disposed on the same side of the frame or housing 281.

The brackets 125 of tool support 134 each comprise in the form shown a shaped plate 339 fixed as by welding to conveyor frame member 260 at their lower ends 341 and curved outwardly and upwardly to define upwardly projecting ends 343 that are spaced from frame member 260 to receive tool 120 therebetween. Preferably plates 339 are spaced longitudinally of frame member 260 so that the support ends 343 may be received between tool handles 334 and 338 (see FIG. 8A) when tool 120 is applied to support 134 so as to rest on plates 339. Support 134 thus defines a relatively flat slot like securing place for tool 120 in which it is securely held by the orientation of handles 334 and 338 relative to brackets 125.

Swing arm 124 comprises elongate bar 340 having its end 342 suitably keyed to the shaft 126 of rotary actuator 130, and its other end 344 having the aforementioned connection 333 to cable end 332. As indicated in FIG. 1, the ends 342 and 344 are appropriately rounded to avoid exposing the worker to sharp edges. The cable 122 is looped through an opening in the arm end 344 to form connection 333.

The rotary actuator 130 is preferably a TORK-MOR S-4 series standard model single vane unit made and sold by Roto Actuator Corporation of St. Clair Shores, Mich. FIG. 9 diagrammatically illustrates the nature of the actuator 130, which involves the shaft 126 being journaled within housing 350, the shaft 126 being equipped with a vane 352 that rides against the cylindrical wall surface 354 of hydraulic chamber 356 defined by housing 350, between stator 358 that is in sealing relation in the chamber 356 between the housing wall 354 and shaft 126. The chamber 356 is supplied by hydraulic pressure liquid through suitable nipples 360 appropriately connected to stator 358, and to the respective sides of same. Shaft 126 pivots in either direction, as indicated by the double headed arrow of FIG. 9, depending on the flow of hydraulic liquid through chamber 356, as determined by appropriate control valving for the rotary actuator 130.

In accordance with the invention, the bag gripper handle 338 has secured thereto a tape switch 362 that is to be actuated by the worker's hand when gripping handle 338, as will be herein after described. Tape switch 362 is appropriately connected to electrical cord 364 that is loosely mounted on cable 122 and extends to a suitable electrical connection on the conveyor head frame 263 at a point suitably spaced from the actuator 130 and in the direction of the discharge end 108 of conveyor 102.

The tape switch 362, cord 364, and actuator 130 are arranged such that when the worker presses the switch 362, contacts are closed which actuates actuator 130 to pivot shaft 126 and thus swing arm 124 clockwise of FIG. 1 between the broken lines positions there illustrated, and upon release of the tape switch 362, the swing arm 124 is returned to its initial position.

In utilizing the bag grabber and rotary actuator assembly 370 thereby provided, the worker integrates this labor saving device into basic operation of the auxiliary conveyor 10 when the heavier, awkward bags are to be shifted between their place of rest in the vehicle and the conveyor 11, and this will be described in connection with the description of the basic method steps to be performed in accordance with the invention hereinafter discussed in detail.

Figure 14:
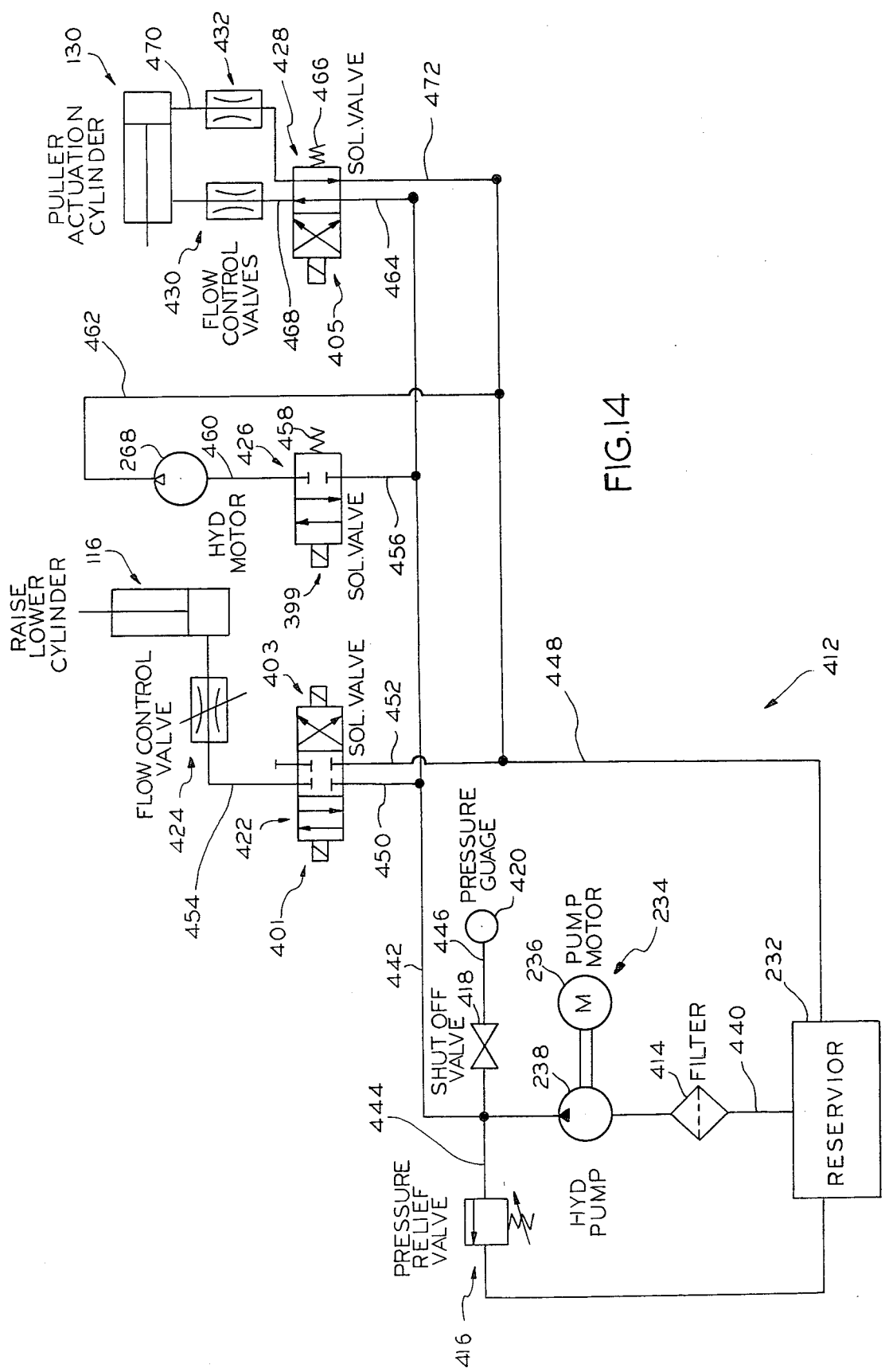
FIG. 14 is a schematic view diagrammatically illustrating hydraulic circuiting appropriate for practicing the invention.

In practicing the invention, the actuator for swing arm 124 may also be of the linear type, which would involve having arm 124 keyed to a shaft comparable to shaft 126 that is journaled between side frame members 262 and 264 of the head conveyor frame 263, and actuating such shaft through a crank arm using a piston and cylinder assembly of the general type represented by device 116 hydraulically connected as indicated in FIG. 14.

The hydraulic liquid motor pump unit 234 supplies hydraulic pressure liquid under pressure to hydraulic belt drive motor 268, the rotary actuator 130 and the hydraulic piston and cylinder device 116 with suitable valving and other controlling mechanisms being employed, which are arranged to be controlled by the individual push buttons or other actuating implements of the control panel 131. The auxiliary conveyor 10 is also suitably electrically connected to conveyor 11 to supply to the conveyor 10 and its electrically operated components comprising same with the necessary source of electrical power. Electrical cord 364 is integrated into the circuitry involved for the purpose of controlling the operation of the rotary actuator 130 that has been previously referred to.

The control panel 131 (see FIG. 1A) is illustrative of appropriate control implementing for practicing the invention, comprises a switch box 371 appropriately mounted on conveyor frame 263 and equipped with switch operating buttons 373, 375, 377, 379, 381, 383, 385, 387, and 389, and toggle off-on switch 391. Switch buttons 375 and 389 respectively effect raising and lowering of conveyor head 84, switch buttons 377 and 387 effect starting and stopping of the conveyor belts (simultaneously) of conveyors 10 and 11, switch buttons 379 and 385 effect starting and stopping of hydraulic pump assembly 234, switch buttons 381 and 383 effect movement of conveyors 10 and 11 forwardly and rearwardly of vehicle 14 (by suitable electrical connection to the forward and rearward movement drive of conveyor 11), and switch button effects emergency shut down of all functions of conveyors 10 and 11. Toggle switch 391 effects starting and stopping of rotary actuator 130.

By way of specific illustration, FIG. 14 illustrates diagrammatically a hydraulic circuit 412 for operating the conveyor head hydraulic piston and cylinder device 116, the rotary actuator 130, and the hydraulic belt drive motor 268. In this diagrammatically illustrated circuit 412, hydraulic pump 238 draws hydraulic pressure liquid from the reservoir provided by sump 232 through conduit 440 and the suitable filter 414 interposed in the latter, and supplies it to pressure side supply conduit 442. Conduit 444 connected between the conduit 442 adjacent the high pressure side of pump 238 and the sump provides for relief of excess pressures by return to sump through suitable pressure relief valve 416. Pressure gauge 420 connected to conduit 442 by conduit 446 through suitable shut off valve 418 provides for a reading of the pressures in conduit 442.

Return conduit 448 returns the hydraulic pressure liquid to tank, as represented by sump 232, from the various hydraulic devices operated by the hydraulic pressure liquid of system 412.

In the case of piston and cylinder device 116, supply and return conduits 450 and 452 are respectively connected between main supply conduit 442 and main return conduit 448, and four way control valve 442 that is controlled by solenoid devices 401 and 403 to open the conduit 454 that is connected between the valve 442 and the piston and cylinder device 116 (through suitable volume flow control valve 424) for hydraulic pressure liquid flow communication with either the conduit 450 or 452, depending on whether device 116 is to be extended or retracted, as will be apparent to those skilled in the hydraulic arts. Solenoid devices 401 and 403 are operated to position valve 422 as needed using control panel 131.

With regard to the hydraulic belt drive motor 268, conduit 456 is connected between supply conduit 442 and the two position control valve 426, which is spring biased to the closed position, as indicated by the diagrammatically illustrated spring 458 in connection with the valve 426, but which is shifted to the hydraulic pressure liquid supplying condition by solenoid device 399 (using control panel 131), whereby hydraulic pressure liquid is supplied to motor 268 through conduit 460 and thence through conduit 462 to return conduit 448, as long as valve 426 is held in its open position against the biasing action of spring 458 by solenoid device 399.

With regard to the rotary actuator 130, conduit 464 extends between supply conduit 442 and the two position valve device 428 for making hydraulic pressure liquid available to the rotary actuator 130 to shift the swing arm 124 to the left hand phantom position of FIG. 1, and hold it in that position, so long as the valve 428 has the position shown in FIG. 14, under, for instance, a suitable biasing spring actuation illustrated by the showing of spring 466. In this condition, hydraulic pressure liquid flows from valve 428 through conduit 468, suitable hydraulic volume flow control valve 430, rotary actuator device 130, conduit 470 and its hydraulic liquid flow control valve 432, back to valve device 428 for communication to conduit 472 that is connected to main return conduit 448.

When solenoid device 405 is actuated to shift the position of valve 428 to the other position indicated in FIG. 14, the flow through rotary actuator 130 is reversed to swing the swing arm 124 from the left hand dashed line position of FIG. 1 toward the right hand dashed line position of FIG. 1, as controlled by tape switch 362.

FIGS. 12 and 13 illustrate diagrammatically suitable electrical circuiting for controlling the overall apparatus herein described in practicing the invention.

In the showing of FIG. 12, lines 480, 482 and 484 are connected to a suitable source of three phase AC current and drive pump motor 236 through relay operated switches 395A, 395B, and 395C, and the circuit breakers indicated at 486. Lines 480 and 482 are connected to the primary side of transformer 488, the secondary side of which is connected in control circuit 490 that is arranged following known electrical techniques to connect the various switches and solenoid devices indicated in FIGS. 12–14 for operating the various components of the invention as will be described in detail.

In the control circuit 490, control relay 395 when energized closes switches 395A, 395B, 395C and 395D, this being effected when normally open switch 379A, as actuated by push button 379, is closed to start the pump motor 236 and thus the pump 238. Normally closed switch 385A is opened to stop the operation of the pump motor 236, and this is done by way of using push button 385. This effects de-energization of control relay 395 and opens switches 395A, 395B, 395C and 395D.

Push button 373 is arranged conventionally to simultaneously open normally closed switches 373A and 373B (see FIG. 13) to effect a complete shut down of the system for emergency purposes.

In this connection, FIG. 13 schematically illustrates segments of the conventional circuiting for controlling the indicated components of the roll-in conveyor 11 for the purpose of illustrating switches controlled by the use of the control panel 131. Thus, control panel 131 or its equivalent is to be conventionally arranged to provide for push button 373 to open normally closed switches 373A and 373B, with the switch 373B having its contacts incorporated in the main circuiting 492 for supplying electrical power to the electrically operated components of conveyor 11, in such a manner that the operation of both the roll-in conveyor 11 and the auxiliary conveyor 10 may be shut down on an emergency basis by using push button 373 to open normally closed switches 373A and 373B.

Normally open switch 377B and normally closed switch 387B of FIG. 13 are incorporated in the circuiting 494 for controlling the operation of the conveyors of conveyor 11 and control panel 131 is to be arranged so that push button 377 closes normally open switches 377A and 377B simultaneously while push button 387 opens normally closed switches 387A and 387B simultaneously to stop operation of the belts of both the conveyors 10 and 11; solenoid device 494A is shown in circuiting 494 to indicate that the drive of the conveyor belts of conveyor 11 is actuated by way of energization and de-energization of a relay that closes and opens the switch components involved.

Referring back more specifically to the control circuit 490, the closing of the switch 377A actuates control relay 397 to close switch 397A that effects energization of solenoid device 399 that shifts control valve 426 of FIG. 14 to its position for supplying hydraulic pressure liquid to drive motor 268 for belt 100. The opening of normally closed switch 387A deenergizes control relay 397 to open switch 397A and deenergize solenoid device 399 whereby the spring bias acting on valve 426 shifts it back to the position shown in FIG. 14 to discontinue operation of belt 100.

The closing of switch 375A by using push button 375 energized solenoid device 401 which shifts the four way control valve 422 to supply hydraulic pressure liquid to device 116 for raising conveyor head 84. Switch 397A is of the normally open type and thus release of switch 397A without more is effective to hold the conveyor head 84 at its desired position of elevation, due to the spring bias return of valve 422 to the position of FIG. 14, it being understood that the valve 422 is physically arranged conventionally so that it centers at the no flow position by suitable spring biasing action when solenoid devices 399 and 401 are both deenergized.

The closing of normally open switch 389A energizes solenoid device 403 to shift the valve 422 to permit the hydraulic liquid of device 116 to return to sump, for lowering of the conveyor head 84 under gravity. Again, release of the normally open switch 389A deenergizes solenoid device 403 to reposition the valve 422 to the position of FIG. 14 whereby the conveyor head 84 is held at its desired position of elevation, as set by releasing the operating push button 389.

The toggle off-on switch 391 conditions the control circuit 490 such that when tape switch 362 is closed, the solenoid device 405 is energized to shift valve 428 from its position of FIG. 14 to its opposite position for effecting swinging of the swing arm 124 clockwise of FIGS. 1 and 2 for the indicated pulling of the bags out of the stack to apply same to the conveyor head 84. Release of the normally open switch tape 362 deenergizes solenoid device 405 so that valve 428 switches back to the position of FIG. 14 and effects return of the swing arm 124 to its at ready right hand dashed line position of FIG. 1. The tape switch 362 may be of any conventional type of switch in this category.

Referring again to FIG. 13, circuit 500 diagrammatically illustrates the electrical energy supply to the magnetic brake device 502 that is operably associated with the heretofore mentioned winch assembly 45 that operates on cable 43 of conveyor 11. Circuit 504 diagrammatically is illustrative of the electrical energy supply to the electrically powered gear motor 506 that is operably associated with said winch assembly 45 for wind up of the cable 43 thereon.

Accordingly, the control panel 131 is arranged so that push button 381 closes normally open switch 381A to effect control as needed in any conventional manner on the magnetic brake device 502 to control the letout of cable 43 from winch assembly 45 that provides for movement of the tandem connected conveyors 10 and 11 in the direction of the vehicle to be unloaded, while push button 383 is arranged to close normally open switch 383A that closes circuit 504 for the purpose of wind up of cable 43 on its winch to effect the tandem movement of conveyors 10 and 11 away from the vehicle and toward the retracted position of conveyors 10 and 11.

It will be apparent that the arrangement of the control panel 131 and hydraulic and electrical circuiting employed may, generally speaking, be of any suitable type and modified or varied to some special situations or facilitate the work of the individual operating the conveyor 10 in conjunction with the conveyor 11. As a matter of convenience, the source of electrical power for the conveyor 10 is obtained by suitable connection to conveyor 11, with connections made to switch box 371 as needed. The functions of push buttons 375, 381, 383 and 389 may be conveniently incorporated in a four way, joy stick operated, switch, suitably incorporated in control panel 131, one suitable form of which is made and sold by Allen Bradley Co. of Milwaukee, Wisconsin. For purposes of disclosure, it is assumed that the push buttons of control panel 131 are spring biased outwardly of the panel so that they are to be pushed inwardly to provide the functions indicated.

It is pointed out that when conveyor 11 is actuated to move it toward the bags 17 to be unloaded, in practice this is done by way of effecting a controlled release of the magnetic brake that is associated with winch assembly 45, so that conveyor 11 rolls under gravity to its loading positions under the control of the magnetic brake. This may be done in any suitable manner, and for purposes of this disclosure it is assumed that actuation of push button 381 and the normally open switch 381A provide this result, with the opening of switch 381A braking the conveyor 11 (and conveyor 10 that is in tandem with it) to a full stop by placing the magnetic brake in its full stop mode. The movement of conveyor 11 that is required to practice the invention may be effected using existing drive and braking systems therefore, modified for control by way of a suitable push button control system following the suggestions of FIGS. 1A, 12 and 13.

METHOD OF UNLOADING BULK MAIL

As has already been indicated, the roll-in conveyor 11 as equipped with auxiliary conveyor 10 when not in use is fully retracted to the positioning indicated in FIGS. 10 and 11, in which position the piston and cylinder device 116 may be operated to sufficiently elevate the conveyor head 84 that it will be out of the way for easy worker and equipment access across dock plate 18 for purposes of moving between adjacent bay 17 and the like. Conveyor head 84 may also be swung to one side or the other as may be convenient. The bag grabber tool 120 is at rest on tool support 134 or other suitable support on head 84. Under these conditions, the motor pump unit is not operating.

When a loaded vehicle 14, which may be assumed to be a semi-trailer or the like, loaded with bulk mail, is backed into bay 17, as part of the backing procedure the doors blocking rear opening 26 are opened and the dock plate 52 sufficiently elevated by employing hydraulic piston and cylinder device 58 so that its projecting end 53 is above the level of the vehicle floor 30 and then is rested on same as indicated in FIG. 10, as the backing of the vehicle into unloading position is completed. The motor pump unit 234 of conveyor 10 is then started using push button 379 to put the hydraulic circuit 412 and electrical control circuit 490 in operation.

The worker assigned to unload the vehicle 14 then manually aligns head 84 or conveyor 10 with the bay 17, and lowers head 84 as needed using button 389. He then effects (using button 381) forward movement of the conveyor 11 to move the conveyor 10 toward adjacency with the end bag or carton stack in the vehicle body. When the auxiliary conveyor 10 has approximately the position of adjacency relative to the first stack that is indicated in FIGS. 1 and 2 for the bag stack there illustrated, movement of the conveyors 10 and 11 is ceased (by releasing button 381 to open switch 381A), button 377 may then be operated to start the conveying movement of belts 42 and 102 (by closing switches 377A and 377B), which is in the direction indicated by the arrows 393 and 395 of FIG. 2 and at the indicated speed of one hundred feet per minute.

The worker then operates the control for piston and cylinder device 116 (buttons 375 and 389) as needed to dispose the load receiving end or nose 106 of a conveyor head 84 at a level below the top tier of the initial stack being worked on that lies in the range of from about 2 to about 12 inches below the approximate horizontal underside level of the top tier of the stack.

With the conveyor head 84 thus upwardly angled, the worker, as he will normally be standing on the control panel side of the conveyor head 84, may grasp handle 132 and effect side swinging movement of the conveyor head 84, to dispose or aim the load receiving end or nose 106 of conveyor head 84 in alignment with, for instance, the end mail bag 23 of the top tier 25 (of the mail bag stack 27) that is exposed at the open end of the vehicle, which bag is at the side wall 28 of the vehicle. This would be a position comparable to that of FIG. 2 except that the stack 27 in question is at the other end of the vehicle. By utilizing the indicated push button controls, the nose or load receiving end of the conveyor head 84 may be moved closer to such end bag 23 to moving conveyor 11, and thus conveyor 10, forwardly of the vehicle as needed.

Assuming that the mail bags 23 of the top tier 25 of the mail bag stack 27 in question, are judged by the worker to be of comparatively light weight, the worker grasps the indicated tier end bag 23 and pulls it outwardly of the stack (rearwardly of the vehicle) sufficiently so that the outwardly pulled end can be dropped on the load transport surface 104 of belt upper run 102. A sufficient amount of the bag should be pulled out of the stack so that when the bag outer end is dropped on the conveyor 100, sufficient traction is established between the transport surface 104 and the bag such that the belt conveyor 100 then pulls the bag onto the conveyor. This bag then proceeds across conveyor head 84 and is discharged onto conveyor belt 42 for conveyance to the succeeding conveyor that in turn conveys the bag in question to the BMC sorting facilities.

In the meantime, the worker then pulls the head 84 toward him, using handle 132, into aiming alignment with the next succeeding bag of the tier, and assuming that this bag is likewise of a similar light weight character, the worker pulls this bag out over the end of the conveyor head 84 to the extent indicated and releases same so that the pulled out portion of the bag drops in like manner onto belt upper run 102, with the belt 100 then pulling the second bag in question completely onto the conveyor head 84 and across same for discharge onto conveyor 42 for further conveyance in the manner aforedescribed.

The worker handles the next succeeding bags 23 of the top tier 25 of the stack 27 in question in like manner to completely remove the bags 23 of the top tier 25 from the vehicle.

As the tier 25 in question has been indicated to be the top tier of the end stack in question, it is assumed that the bags forming same are relatively light in weight.

The worker then proceeds to handle the second tier 25 of the end stack 27 in like manner, but lowering the load receiving end or nose of the head 84 below the underside level of the second tier, within the elevation range indicated (using button 389) for the first tier 25, and again pushing the conveyor head to the sidewise disposed position suggested in FIG. 2 at the top of the figure. Assuming that the mail bags 23 of the second tier 25 are all judged to be of relatively light weight by the worker, they are then successively handled in the same manner as the first tier.

Assuming that all of the bags 23 of the end stack 27 are of relatively light weight, they are all processed in a similar manner.

It is quite probable, however, that a number of the bags in the lower tiers of the stack will be of the maximum permitted weight, whether filled or unfilled, as previously indicated.

It is an objective of this invention that bags 23 that weigh more than approximately 30 pounds be handled entirely mechanically, and is for the purpose of handling these heavier bags, and others that in the judgment of the worker need entirely mechanical handling, that the bag grabber and rotary actuator mechanism 370 has been provided.

Where the worker encounters such a bag in the stack tier he is working on, after "aiming" the conveyor head 84 at the bag in the manner that has been indicated, he moves to the on position toggle switch 391 that energizes the rotary actuator 130, the operation of which may now be controlled using normally open tape switch 362.

The worker then picks up the bag grabber tool 120 from its position of rest on head 84, and grasps the handle 334 with his left hand and the handle 338 with his right hand, with the hand tool frame 281 being disposed below the operator's hands, and thus being positioned substantially as indicated in FIG. 1. In the at ready position of the rotary actuator, the swing arm 124 is in the broken line position to the left of the full line position of FIG. 1 so that the cable 122 is free of tension and actually has adequate slack so that the bag grabber 120 may be moved well forward or to the left of the conveyor head nose or load receiving end 106 (in this position of arm 124, valve 428 has the position shown in FIG. 14). The worker shifts handle 338 toward handle 334 so as to fully open the tool jaws 286 and 288, and then brings the bag grabber 120 into juxtaposition with a convenient outwardly projecting end of the bag 23 to be shifted. The worker then shifts the handle 338 to the right of handle 334 which not only closes the jaws 286 and 288 on the bag, but also closes the tape switch 362 to shift valve 428 to actuate the rotary actuator 130 whereby the swing arm 124 swings clockwise of FIG. 1 and thereby tensions the cable 122 to both close the hand tool jaws 286 and 288 on the bag, and pull the bag rearwardly of the vehicle. The continued swinging movement of the swing arm 124 maintains the clamping action of the jaws 286 and 288 on the bag, which results in the bag being drawn out of its position of rest in the stack and onto the load transport surface 104 of conveyor belt upper run 102. When the bag has the same motion as the belt run 102, tension in the cable 122 disappears and the gripping action of jaws 286 and 288 of the bag grabber 120 on the bag is released. On release of the jaws 286 and 288 the operator should release tape switch 362, whereby valve 428 returns to the position of FIG. 14, and the rotary actuator returns the swing arm 124 back to the left hand broken line position of FIG. 1 to await the next use of the apparatus 370. If the worker chooses not to use the apparatus 370 for the next bag to be shifted, he replaces the bag grabber 120 on its support 134 to manually handle the next adjacent bag in the aforedescribed manner to apply same to the conveyor head 84.

When cartons are encountered in the vehicle load, they are handled in a similar manner. As cartons are of regular parallelepiped configuration, they can readily be grasped by the worker with two hands at either side of same and drawn out of the stack sufficiently to drop on the conveyor head for being fully drawn out of the stack and over the conveyor head and onto conveyor 11.

Practicing the invention in this manner, the worker using the auxiliary unloading conveyor 10 in combination with the conveyor 11 is enabled to completely clear the vehicle 14 of its bulk mail load free of most of the laborious, tiring, and time consuming worker motions and maneuvering heretofore required for such work.

When wheeled containers and/or palleted goods are encountered in the load, the worker operates the push button control panel (button 383) whereby winch mechanism 45 is operated to retract the conveyor 11 and its auxiliary conveyor 10 from the vehicle 14 back to the position of FIGS. 10 and 11. The conveyor head 84 may then be swung 80 degrees to one side or the other, and in the case of the containers on rollers, these can then be rolled out of the vehicle over the dock plate 18 and onto the loading dock surface 16 free of interference with the apparatus 10. Conveyor head 84 may be elevated as needed to effect this end.

Similarly, where palleted goods are involved, the conveyors 10 and 11 are similarly withdrawn to the position of FIGS. 10 and 11, and the four wheel platform lift trucks necessary to pick up the palleted goods can be moved from the loading dock surface 16 over dock plate 18 and into vehicle 14 to pick up the palleted goods, and then be returned over the dock plate 18 to the unloading dock surface 16, free of interference with the auxiliary conveyor 10.

The combination provided by the conveyors 10 and 11 accommodates the cantilever load supporting action of conveyor 10 which is thus counterbalanced by the securement of the chassis 80 to the frame 44 of conveyor 11, which in practice has a weight that is far in excess of that needed to resist the thrusts applied to the load receiving end 46 of the conveyor 11 due to any weight loads applied to conveyor head 84.

It will therefore be seen that the present invention provides a method and apparatus for unloading bulk mail carrying vehicles that renders the shifting of the bags and cartons involved a largely mechanical function, thereby rendering minimal if not substantially eliminating the labor and worker stress heretofore required to shift the bags and cartons from their position of rest on the vehicle onto the roll-in conveyor for conveyance to the bulk mail center sorting facility. In addition to the increased worker efficiency and productivity that will be a result of the practice of my invention, the hazards of this sort of work and the potential for serious worker injury will be substantially eliminated, particularly from the standpoint of back injuries and hernias.

In practicing the present invention, the handling of 70 pound mail bags, whether fully or partially loaded, is made as easy as the handling of relatively light mail bags and cartons. The auxiliary conveyor of the present invention operates as an implement to in effect substitute hydraulic power for muscle power in bulk mail van unloading operations.

It is well known to those familiary with U.S. Postal Service bulk mail unloading operations that when unloading heavy mail bags, heretofore workers have paced themselves to minimize fatigue and this factor has drastically lowered desired productivity when heavy bags are encountered in a van to be unloaded. Worker injuries, particularly in the way of back injuries and hernias, have been frequent with the resulting attendant medical expense, cost of replacement workers, and frequent absenteeism due to the psychological factors involved in the risks in this sort of work and the anticipation of undue physical stress and strain as the worker contemplates his job.

The auxiliary unloading conveyor of this invention, in addition to the labor saving benefits provided, is arranged to accommodate the relatively short distance between the load receiving end of the roll-in conveyor and the anchored leaf of the dock plate, which is approximately 18 inches in practice. The vertical angulation and horizontal swinging action provided by the conveyor, together with the two wheel vertically disposed chassis involved, so disposes the auxiliary unloading conveyor in its inoperative position to freely accommodate wheeled containers and four wheeled platform lift trucks, or the like, that for one reason or another must be moved between the unloading dock and the vehicle across the dock plate.

An important feature of the auxiliary unloading conveyor of the invention is its pivotal connection to the load receiving end of the roll-in conveyor, which allows the auxiliary unloading conveyor to follow the varying inclinations of the dock plate that will be encountered in practice due to the variation in the elevations of vehicle floors of the vans to be unloaded in accordance with the invention.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a facility for unloading discrete bagged and cartoned goods from the load receiving area of an end loading transport vehicle including an unloading dock having an unloading bay defining a load receiving shoulder equipped with a dock plate adapted to bridge the gap between the loading dock and the vehicle end opening when the vehicle is backed into load discharging relation with respect to the bay, and an elongate mobile unloading conveyor mounted on the loading dock for movement along a rectilinear path between a retracted position on the loading dock in which the load receiving end of same is spaced from the dock plate inwardly of the loading dock and an extended relation for movement of the load receiving end of same across the dock plate into the vehicle load receiving area for having applied to the load receiving end of same the bagged and cartoned goods to be unloaded from the vehicle, and means for driving the conveyor to convey the bagged and cartoned goods received thereon onto the loading dock as they are applied to the conveyor load receiving end, the improvement comprising:
 a chassis connected to the unloading conveyor adjacent its load receiving end and disposed in advance of same with respect to the unloading bay,
 said chassis journalling wheels, on which said chassis rides, for rotation about a common axis extending transversely of the movement path,
 said chassis being pivoted to the conveyor for swinging movement relative thereto about a horizontal axis extending transversely of the unloading conveyor,
 said chassis journalling an upright shaft for pivotal movement about an axis that is normal to the movement path,
 said shaft and said axis of said wheels being in coplanar relation in an upright plane extending transversely of the movement path,
 said shaft having mounted on the upper end of same a conveyor head for movement about an axis extending normally of said shaft axis,
 said head being cantilever mounted on said shaft to project over the dock plate when horizontally disposed in alignment with the movement path,
 an adjustable strut structure connected between the lower end of said shaft and said head for supporting said head cantilever fashion from said shaft and including power means for adjusting the length thereof for adjusting the forward end of said head vertically,
 said head including an endless conveyor presenting an upwardly facing load receiving run and including means for driving said run to move toward the unloading conveyor,
 said endless conveyor having a load receiving end adjacent the forward end of said head and a load discharge end at the other end of said heard disposed to discharge the bagged and cartoned goods onto the load receiving end of said mobile conveyor when said head is substantially aligned therewith,
 said shaft being journalled for free swinging movement of same and said head about said shaft pivot axis with sufficient static friction opposing said swinging movement to maintain said head and shaft at desired positions of manual adjustment angularly of said shaft pivot axis,
 said head carrying a bag shifting mechanism including:
 a manually manipulatable bag gripping hand tool,
 a cable connecting said hand tool to said head adjacent one side of said head intermediate the ends of said head,
 said cable having sufficient length to permit said tool to be manually extended beyond the forward end of said head for application in gripping relation to a bag to be shafted from a position of rest in the vehicle onto the head conveyor run, when said head has been positioned to be adjacent and directed toward the bag,
 means for drawing said cable longitudinally of said head to draw the bag onto the head conveyor run,
 and means for automatically releasing said tool from the bag when the bag is conveyed by said head conveyor run for manual application to another bag to be shifted onto said head.

2. In a facility for unloading discrete bagged and cartoned goods from the load receiving area of an end loading transport vehicle including an unloading dock having an unloading bay defining a load receiving shoulder equipped with a dock plate adapted to bridge the gap between the loading dock and the vehicle end opening when the vehicle is backed into load discharging relation with respect to the bay, and an elongate mobile unloading conveyor assembly mounted on the loading dock for movement along a rectilinear path between a retracted position on the loading dock in which the load receiving end of same is spaced from the dock plate inwardly of the loading dock and an extended relation for movement of the load receiving end of same across the dock plate into the vehicle load receiving area for having applied to the load receiving end of same the bagged and cartoned goods to be unloaded from the vehicle, and means for driving the conveyor to convey the bagged and cartoned goods received thereon onto the loading dock as they are applied to the conveyor load receiving end, the improvement comprising:

a chassis connected to the unloading conveyor assembly adjacent its load receiving end and disposed in advance of same with respect to the unloading bay, said chassis journalling a pair of spaced apart wheels, on which said chassis rides for rotation about a common axis extending transversely of the movement path, with said wheels being spaced from the load receiving end of the conveyor assembly such that in the retracted position of the conveyor assembly, said chassis wheels reset on the loading dock between the conveyor assembly load receiving end and the dock plate, said chassis being connected to the conveyor assembly by being pivoted to the conveyor assembly adjacent its load receiving end for swinging movement relative thereto about a horizontal axis extending transversely of the unloading conveyor assembly, said chassis journalling an upright shaft for pivotal movement about an axis that is normal to the movement path, said shaft and said axis of said wheel being in coplanar relation in an upright plane extending normally of the movement path, said shaft having mounted on the upper end of same a conveyor head for movement about an axis extending transversely of said shaft axis, said head being cantilever mounted on said shaft to project over the dock plate when horizontally disposed in alignment with the movement path, an adjustable strut structure connected between the lower end of said shaft and said head for supporting said head cantilever fashion from said shaft and including means for adjusting the length thereof for adjusting the forward end of said head vertically, said head including an endless conveyor presenting an upwardly facing load receiving run and including means for driving said run to move toward the unloading conveyor, said endless conveyor having a load receiving ed adjacent the forward end of said head and a load discharge end at the other end of said head disposed to discharge the bagged and cartoned goods onto the load receiving end of said mobile conveyor when said head is substantially aligned therewith, said shaft being journalled for free swinging movement of same and said head about said shaft pivot axis, with sufficient static friction opposing said swinging movement to maintain said head and shaft at desired positions of manual adjustment angularly of said shaft pivot axis, said head carrying a bag shifting mechanism including:

a manually manipulatable bag gripping hand tool, a cable connecting said hand tool to said head adjacent one side of said head intermediate the ends of said head, said cable having sufficient length to permit said tool to be manually extended beyond the projecting end of said head for application to a bag to be shifted from a position of rest in the vehicle onto the head conveyor run, when the head has been positioned to be adjacent and directed toward the bag, means for drawing said cable longitudinally of said head to draw the bag onto the head conveyor run, and means for automatically releasing said tool from the bag when the bag is conveyed by said head conveyor run for manual application to another bag to be shifted onto said head.

3. The improvement set forth in claim 2 wherein:

said head comprises a conveyor assembly that includes said endless conveyor and a conveyor support frame on which said head conveyor assembly is removably mounted as a unit, said head frame being pivotally mounted on said shaft upper end for providing said head movement about said axis that extends transversely of said shaft axis.

4. The improvement set forth in claim 2 wherein said chassis comprises:

a cross beam extending transversely of the movement path and projecting to either side of same, said cross beam being proportioned transversely of the movement path to enter the vehicle end opening, and at either end of same having a leg secured to same outboard of said head, with said wheels being journalled adjacent the lower ends of said legs, and an upright tube made fast to and extending through said beam, with said shaft being journalled in said tube.

5. The improvement set forth in claim 4 wherein:

said head conveyor assembly includes hydraulic motor means for driving said head endless conveyor, and including hydraulic system means for supplying hydraulic pressure liquid to said hydraulic motor means for driving same, said beam being hollow and being charged with the hydraulic pressure liquid, with said hydraulic system including pump means for drawing the hydraulic pressure liquid therefrom, and conduit means for conveying the hydraulic pressure liquid from and to said beam under the action of said pump means, whereby said beam serves as the sump for said hydraulic system.

6. The improvement set forth in claim 2 wherein said bag gripping hand tool comprises:

a housing having opposite end portions that are open, said housing at one of said end portions having a pair of opposed jaws pivotally mounted in same and each defining a gripping end porjecting from said one housing end portion, said housing at the other end portion thereof having an actuating member shiftably mounted in same for movement toward and away from said jaws, said actuating member having one end of same projecting from said housing other end portion with said cable being made fast thereto, and with said actuating member other end being connected to said jaws by toggle means for closing said jaws when said actuating member one end is moved away from said housing under tension acting on said cable, a first handle affixed to said housing and a second handle affixed to said actuating member for moving same relative to said housing, said second handle including off-on control means for controlling operation of said drawing means, whereby in operation of said hand tool the operator grasps one of said handles in one hand and the other of said handles in the other hand, and positions the tool for disposing the tool jaws to grip the bag that is to be shifted onto the head conveyor run, whereupon said second handle may be moved to move said actuator member outwardly of said tool housing and set said jaws against the bag to grip same, and said second handle off-on means is actuated to activate said drawing means to draw the gripped bag onto the head conveyor run for conveyance thereby, said second handle off-on means thereupon being actuated to deactivate said drawing means, said toggle means comprising said automatically releasing means.

7. The improvement set forth in claim 6 wherein:

said jaws are defined by lever elements disposed in opposed coplanar relation and pivotally mounted in said housing for the closing of said jaws under the action of said toggle means, said handles being on the same side of said housing and disposed normally of the plane of said lever elements.

8. The improvement set forth in claim 6 wherein said drawing means comprises:

a swing arm mounted on said one side of said head for pivotal movement toward and away from said head forward end about a horizontal axis extending transversely of the movement path approximately at the level of said head, said cable being anchored to the projecting end of said swing arm to connect same to said head, and power means for pivoting said swing arm about said axis thereof between an upwardly inclined flat angle position relative to said head extending toward said head forward end and an upwardly inclined flat angled position relative to said head extending toward the other end of said head, said second handle off-on control means comprising switch means for controlling said power means to swing said swing arm toward said head other end when on and to swing said swing arm toward said head forward end when off.

9. In apparatus for unloading bagged goods from the load receiving area of an end loading transport vehicle onto an unloading dock, where the transport vehicle is backed into load discharging relation adjacent the dock to dispose its end opening to pass the bags therethrough, and including an elongate wheeled conveyor movably mounted on the loading dock for movement into and out of the vehicle and having on the forward end of same a cantilever mounted conveyor head having the load receiving end of same at the projecting end of the head, means for adjusting the position of the head load receiving end horizontally and vertically for individual alignment with individual bags stacked in the transport vehicle for transfer to the loader head, and means for moving said conveyor and conveyor head into the vehicle to receive individual bags as the vehicle is unloaded for conveyance to the loading dock, and for withdrawing the conveyor and conveyor head from the vehicle back onto the dock, a bag shifting apparatus for mechanically transferring individual bags from random positions, transversely of the vehicle, at rest within a stack of the goods in the vehicle to be unloaded, to the loader head and comprising:

a manually manipulatable bag gripping hand tool, a cable connecting said hand tool to said head inermediate the ends of said head, said cable having sufficient length to permit said tool to be manually extended beyond the projecting end of said head for application in gripping relation to the bag to be shifted from a selected position of rest in the vehicle onto the head load receiving end when the head has been positioned to be adjacent and directed toward the bag, means for drawing said cable longitudinally of said head to draw the bag onto the head conveyor run, and means for automatically releasing said tool from the bag when the bag is conveyed by said head conveyor run for manual application to another bag to be shifted onto said head.

10. The improvement set forth in claim 9 wherein said bag gripping hand tool comprises:

a housing having opposite end portions that are open, said housing at one of said end portions having a pair of opposed jaws pivotally mounted in same and each defining a gripping end projecting from said one housing end portion, said housing at the other end portion thereof having an actuating member shiftably mounted in same for movement toward and away from said jaws, said actuating member having one end of same projecting from said housing other end portion with said cable being made fast thereto, and with said actuating member other end being connected to said jaws by toggle means for closing said jaws when said actuating member one end is moved away from said housing under tension acting on said cable, a first handle affixed to said housing and a second handle affixed to said actuating member for moving same relative to said housing, said second handle including off-on control means for controlling operation of said drawing means, whereby in operation of said hand tool the operator grasps one of said handles in one hand and the other of said handles in the other hand, and positions the tool for disposing the tool jaws to grip the bag to be shifted onto the head conveyor run, whereupon said second handle may be moved to move said actuator member outwardly of said tool housing and set said jaws against the bag to grip same, and said second handle off-on means is activated to activate said drawing means to draw the gripped bag onto the head conveyor run for conveyance thereby, said second handle off-on means thereupon being actuated to deactivate said drawing means, said toggle means comprising said automatically releasing means.

11. The improvement set forth in claim 10 wherein:

said jaws are defined by lever elements disposed in opposed coplanar relation and pivotally mounted in said housing for the closing of said jaws under the action of said toggle means, said handles being on the same side of said housing and disposed normally of the plane of said lever elements.

12. The improvement set forth in claim 10 wherein said drawing means comprises:

a swing arm mounted on said one side of said head for movement toward and away from said head forward end about a horizontal axis extending transversely of the movement path approximately at the level of said head, said cable being anchored to the projecting end of said swing arm to connect same to said head, and power means for pivoting same about said axis between an upwardly inclined flat angle position relative to said head extending toward said head forward end and an upwardly inclined flat angled position relative to said head extending toward the other end of said head, said second handle off-on control means comprising switch means for controlling said power means to swing said swing arm toward said head other end when on and to swing said swing arm toward said head forward end when off.

13. In apparatus for unloading a load of discrete and unpalleted bags of mail from the load receiving area of an end loading transport vehicle onto an unloading dock, where the transport vehicle is backed into load discharging relation adjacent the dock to dispose its end opening to pass the bags therethrough, and including an elongate wheeled unloading conveyor movably mounted on the unloading dock for movement into and out of the vehicle and having on the forward end of same a cantilever mounted conveyor head defining an upwardly facing load transport surface along the length thereof and having the load receiving end of said head at the projecting end of the head, means for adjusting the position of the head load receiving end horizontally and vertically for individual alignment with individual bags stacked in the transport vehicle for transfer to the loader head, with said conveyor head having a width on the order of no more than about one quarter of the width of the vehicle load receiving area whereby a worker station is defined on either side of the load receiving end of the conveyor head when the head is disposed within the vehicle load receiving area, and with the head having a length on the order of the vehicle load receiving area width and having its other disposed in load discharging relation onto the unloading conveyor, and means for moving said conveyor and conveyor head into the vehicle to receive individual bags as the vehicle is unloaded for conveyance to the loading dock and for withdrawing the conveyor and conveyor head from the vehicle back onto the dock, the method of mechanically moving the individual bags one at a time from their positions of rest within the vehicle onto the unloading conveyor, said method comprising:

moving the unloading conveyor toward the vehicle to dispose the load receiving end of the conveyor head closely adjacent the first load depth unit of bags to be unloaded, and with the conveyor head positioned approximately at the longitudinal centerline of the vehicle and with the head load transport surface moving rearwardly of the vehicle at a predetermined rate, selecting a bag on the top of the first load depth unit and aiming the head projecting end at the visible portion of the underside of the selected bag, with the head disposed at a level that is below the bag so selected but which is within about a foot of the level of the underside of the bag so selected, pulling the selected bag rearwardly of the vehicle until the bag is moved sufficiently out of the bag load depth unit to drop on the head transport surface, utilizing the tractional engagement of the bag on the head transport surface to pull the remainder of the bag onto the head and convey same across the head onto the unloading conveyor, selecting the next bag of the load depth unit ad repeating said aiming, pulling, and utilizing steps to convey same onto the unloading conveyor, repeating said selecting, aiming, pulling, and utilizing steps on the remaining bags of the load depth unit to consecutively convey such bags onto the unloading conveyor, working bag by bag across the length of the bag load depth unit and downwardly of the bag load depth unit, repeating the moving step to dispose the load receiving end of the conveyor head closely adjacent the next bag load depth unit of bags to be unloaded, repeating the selecting, aiming, pulling and utilizing steps on each bag of the next bag load depth to consecutively convey the bags thereof onto the unloading conveyor, and for the remaining bag load depth units in the vehicle load receiving area, repeating said moving, selecting, aiming, pulling and utilizing steps to consecutively convey the bags thereof onto the unloading conveyor.

14. The method set forth in claim 13 wherein:

the pulling step is performed manually by a single worker positioned at the worker station.

15. The method set forth in claim 14 wherein:

the pulling step for those bags having an apparent weight of over thirty pounds is performed by:

mechanically grasping the bag adjacent the portion thereof at the side of the bag load depth unit facing the head, mechanically pulling the bag onto the head transport surface, and automatically effecting release of the mechanical grasp on the bag when the bag moves with the head transport surface.

16. The method set forth in claim 14 wherein the load includes discrete and unpalleted cartons, and wherein the individual cartons are unloaded by practicing thereon said selecting, aiming, pulling, and utilizing steps.

* * * * *